US012609043B1

(12) United States Patent
Sartore

(10) Patent No.: US 12,609,043 B1
(45) Date of Patent: Apr. 21, 2026

(54) FLIGHT SIMULATOR YOKE WITH CARRIAGE PILLAR

(71) Applicant: Altimeter Motives, LLC, St. George, UT (US)

(72) Inventor: Ronald Henry Sartore, St. George, UT (US)

( * ) Notice: Subject to any disclaimer, the term of this patent is extended or adjusted under 35 U.S.C. 154(b) by 0 days.

(21) Appl. No.: 19/371,252

(22) Filed: Oct. 28, 2025

(51) Int. Cl.
| | |
|---|---|
| *G09B 9/28* | (2006.01) |
| *G09B 9/16* | (2006.01) |
| *G09B 9/20* | (2006.01) |
| *G09B 9/30* | (2006.01) |

(52) U.S. Cl.
CPC .............. *G09B 9/28* (2013.01); *G09B 9/165* (2013.01); *G09B 9/206* (2013.01); *G09B 9/30* (2013.01)

(58) Field of Classification Search
CPC ............. G09B 9/28; G09B 9/165; G09B 9/30
See application file for complete search history.

(56) References Cited

U.S. PATENT DOCUMENTS

| | | | |
|---|---|---|---|
| 3,526,043 A | 9/1970 | Frasca | |
| 4,421,485 A | 12/1983 | Geschwender | |
| 5,240,416 A | 8/1993 | Bennington | |
| 5,431,569 A | 7/1995 | Simpkins et al. | |
| 5,470,232 A | 11/1995 | Kelso et al. | |
| 8,672,758 B2 | 3/2014 | Jaouen et al. | |
| 9,245,453 B1 * | 1/2016 | Macalister | G09B 9/08 |
| 9,275,553 B2 | 3/2016 | Toland | |
| 11,507,081 B2 | 11/2022 | Wathey | |

| | | | |
|---|---|---|---|
| 11,931,658 B2 | 3/2024 | Smit | |
| 11,993,363 B2 | 5/2024 | Hall et al. | |
| 12,243,446 B1 * | 3/2025 | Schmitz | G09B 9/08 |
| 2010/0028837 A1 | 2/2010 | Holloway | |
| 2010/0266991 A1 | 10/2010 | Gregoire et al. | |

(Continued)

FOREIGN PATENT DOCUMENTS

| | | | |
|---|---|---|---|
| CN | 105313132 A * | 2/2016 | |
| CN | 210348870 U | 4/2020 | |
| CN | 211506811 U | 9/2020 | |

(Continued)

OTHER PUBLICATIONS

Translation—CN-105313132-A, Nan Li, 2016 (Year: 2016).*

(Continued)

*Primary Examiner* — Dmitry Suhol
*Assistant Examiner* — Jose Angeles
(74) *Attorney, Agent, or Firm* — Maiorana Patent Law, PA

(57) ABSTRACT

An apparatus comprising a yoke, a pillar, a carriage platform, a stationary platform and a circuit. The yoke may comprise a grip and a yoke shaft configured to enable a rotation of the yoke. The pillar may comprise a carriage receptacle configured to attach to the yoke shaft and a pillar base. The carriage platform may comprise a fastening portion configured to attach to the pillar base, and a rail carriage. The stationary platform may comprise a rail configured to attach to the rail carriage and enable a linear movement of the carriage platform. The circuit may be configured to measure the rotation of the yoke, translate the rotation to a roll input, detect the linear movement of the carriage platform along the rail, translate the linear movement to a pitch input. The pillar may extend a height down from the carriage receptacle to the pillar base.

20 Claims, 12 Drawing Sheets

(56)                    References Cited

U.S. PATENT DOCUMENTS

| | | | |
|---|---|---|---|
| 2019/0096275 A1* | 3/2019 | Redkoles ................ | G09B 9/08 |
| 2024/0249639 A1* | 7/2024 | Thompson .............. | G09B 9/28 |

FOREIGN PATENT DOCUMENTS

| | | | | |
|---|---|---|---|---|
| CN | 212032430 | 11/2020 | | |
| KR | 102777889 B1 | 3/2025 | | |
| WO | WO-2004006211 A1 * | 1/2004 | .............. | G09B 9/12 |
| WO | 200508615 | 1/2005 | | |
| WO | WO-2023115134 A1 * | 6/2023 | .............. | G09B 9/08 |
| WO | 2024111726 | 5/2024 | | |
| WO | 2024158805 | 8/2024 | | |

OTHER PUBLICATIONS

"Amazon.com: Ch Products Flight Sim Yoke USB ( 200-615 ), Black: Video Games", https://www.amazon.com/CH-Products-Flight-Yoke-200-615/dp/B000056SPM, Accessed Oct. 16, 2025.
"Logitechg.com: Flight Yoke System", https://www.logitechg.com/en-us/shop/p/flight-simulator-yoke-system.945-000023, Accessed Oct. 16, 2025.
"Cirrus Mooney USB Yoke", https://www.fsc.it/Product.aspx?lang=ENG&ID=3c182fe8-bd2c-4975-808f-63b7ac070d64, Accessed Oct. 16, 2025.
"Flight Sim Coach—The Best Flight Simulator Yokes in 2025", https://flightsimcoach.com/blog/flight-simulator-yokes/, Updated Sep. 20, 2025, Accessed Oct. 16, 2025.
"Thrustmaster TCA Boeing Yoke Pack for XBox and Windows", https://www.mypilotstore.com/mypilotstore/sep/14495, Accessed Oct. 16, 2025.

* cited by examiner

400

180e   180d

180n

180g 384  162        304′

406              164

402   404

416

304

414b

414a

410

408

412

150

302

382

152

450

100″

160b

150

164

160a

282′

364

154′

352′

170a

170d

172b

172a

168′

366

354′

156

452

204

452

170c

FLIGHT SIMULATOR YOKE WITH CARRIAGE PILLAR

FIELD OF THE INVENTION

The invention relates to computer input generally and, more particularly, to a method and/or apparatus for implementing a flight simulator yoke with carriage pillar.

BACKGROUND

Flight simulators are a popular training tool for pilots and for those interested in aviation. Flight simulator software can be executed on a personal computer, and various types of input can be used for controlling the simulated aircraft. For a more authentic experience or for training, an end-user can use a yoke that is similar to a yoke used in a cockpit of a real aircraft. To provide an authentic experience, the yoke should be capable of being pulled outwards or pushed inwards linearly to control the pitch of the simulated aircraft.

Conventional flight simulator yokes provide the pitch control using a shaft connected to a fixed base (i.e., a shaft that extends straight into a box). The fixed base has the circuitry to measure the movement of the shaft and provide a connection to the computer for the pitch input along with the roll input from rotating the yoke. Using a fixed base, the shaft for pitch control has to be twice as long as the range of linear movement supported. For example, for a shaft that pulls outwards 80 mm from a center position and pushes inwards 80 mm from the center position, a shaft length of 160 mm is needed to accommodate the pitch control alone. However, at the full forwards position, the base has to be able to accept the 160 mm shaft length into the base in order to accommodate the full 160 mm extension of the shaft in the full pitch up position. As a result, the stationary base have at least 320 mm of space to accommodate the fully extended shaft. The long shaft results in a flight simulator occupying a large amount of space, and limits the customizability of the display set up.

Commonly, for a flight simulator, the physical cockpit can be replicated with gauges created and displayed on one computer monitor while a separate computer monitor is used for the flight simulator scenery. For an authentic flight simulation experience, the placement of the flight control yoke with respect to the instrument panels should be as accurately recreated as possible compared to the real-world equivalent (i.e., the aircraft under simulation). Conventional flight simulation yokes (i.e., long shaft with sensors for pitch and roll axis motion at the far end of the yoke, or yokes that pivot on an arc that has a fulcrum below the yoke such as with a Boeing 737 yoke pedestal), have at least two problems when used with a single monitor to represent the instrument panel. For the long shaft approach, a hole through the single monitor would be required to accurately represent the location of the yoke in the real world cockpit. Since displays are not implemented with a hole, the monitor needs to be above the shaft, which results in the top height of the simulated cockpit being too high when the instrument panel is above the yoke. The arc approach is incapable of mimicking many aircrafts that have the yoke on a shaft.

It would be desirable to implement a flight simulator yoke with carriage pillar.

SUMMARY

The invention concerns an apparatus comprising a control yoke, a carriage pillar, a carriage platform, a stationary platform and a circuit. The control yoke may comprise a grip and a yoke shaft configured to enable a rotation of the control yoke. The carriage pillar may comprise a carriage receptacle configured to attach to the yoke shaft and a pillar base. The carriage platform may comprise a fastening portion configured to attach to the pillar base, and a rail carriage. The stationary platform may comprise a rail configured to attach to the rail carriage and enable a linear movement of the carriage platform. The circuit may be configured to measure the rotation of the control yoke, translate the rotation to a roll input, detect the linear movement of the carriage platform along the rail, and translate the linear movement of the carriage platform to a pitch input. The carriage pillar may extend a height down from the carriage receptacle to the pillar base. The height may enable a clearance for a range of the rotation of the control yoke.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
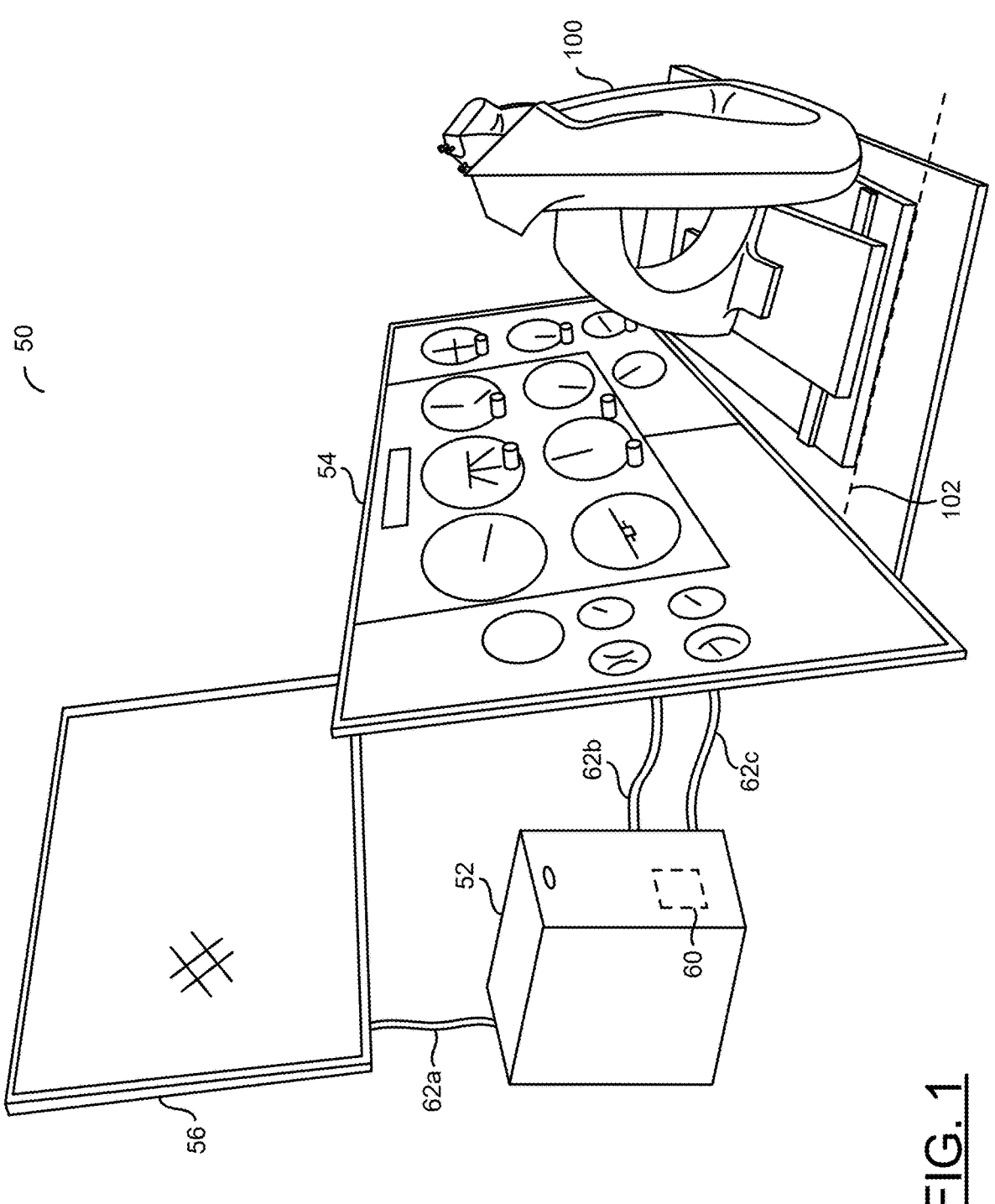
FIG. 1 is a diagram illustrating an example embodiment of the present invention.

Embodiments of the present invention include providing a flight simulator yoke with carriage pillar that may (i) be placed directly in front of a display monitor, (ii) limit an amount of space (e.g., forward-aft space) for measuring linear movement of a control yoke, (iii) approximate a control layout of real flight controls with respect to cockpit instruments, (iv) measure linear (e.g., fore/aft) movement for pitch controls using a moveable carriage platform, (v) provide a fixed and/or adjustable resistance for fore/aft movement of a control yoke, (vi) provide optional force feedback to the control yoke, (vii) mechanically translate linear motion of the control yoke, (viii) enable muscle and eye memory training for developing pilot reflexes and aid in the illusion of flying and/or (ix) be implemented as one or more integrated circuits.

Embodiments of the present invention may provide an input controller for a computing device. The computing device may provide simulation software. For example, the simulation software may be a flight simulator. The input controller may be designed as a replica to match a real-world yoke of an aircraft. The input controller may be configured to provide an authentic flight simulation experience that may enable learning muscle memory and/or eye memory training for developing response reflexes for piloting an aircraft and/or to aid in the illusion of flying when using a flight simulator.

The input controller for flight simulation may be a yoke implemented with a short linear movement mechanism. The short linear movement mechanism may be used to interpret a forward and backwards (e.g., fore/aft) movement of the yoke that may be used to control a pitch of the simulated aircraft. The short linear movement mechanism may enable the input controller to be placed directly in front of an instrument display. For example, the instrument display may be provided on a display monitor for a computer. Providing the input controller with the short linear movement mechanism may enable the input controller to be placed directly in front of the computer monitor to approximate a position of the yoke with respect to the instrument panel display that may match a position of a yoke in a real-world cockpit with respect to the instruments in the cockpit.

The short linear movement mechanism may be configured to translate a pitch movement of the input controller underneath the yoke. The short linear movement mechanism may be implemented with a carriage platform (e.g., a trolley) located a distance (or height) below the yoke of the input controller such that the carriage platform may not interfere with a roll movement (e.g., side to side rotation) of the yoke. For example, a carriage pillar may be implemented having a height below the yoke that provides sufficient clearance between the carriage pillar and the range of various rotation angles of the yoke. The carriage pillar supporting the yoke may move together with the carriage platform and the input controller may be configured to sense the position of the carriage platform. The short linear movement mechanism may eliminate a use of a long shaft for measuring the pitch input.

The input controller may be used in combination with an instrument panel display and/or other multiple monitors. For example, a long shaft implementation may interfere with a size and/or placement of the instrument panel display and/or the other multiple monitors. Many flight simulation software users (e.g., "simmers") may use multiple display monitors to create a panoramic scenery view several feet away from the cockpit. For example, placing the scenery screens far away from the input controller (e.g., which may be necessary when a long shaft is used to provide and/or measure the pitch input) may ruin the immersion of the flight simulation (e.g., screen placement issues may result in unrealistic stitching of the panoramic view across the multiple scenery monitors). The input controller may enable practical placement of the monitors for an immersive flight simulation experience.

The carriage platform may be configured to offset the linear movement to relocate the control mechanism below the yoke portion of the input controller (e.g., rather than implementing the linear movement mechanism directly in front of the yoke). In some embodiments, an inertial measurement unit (IMU) may be implemented to measure movement without using a shaft. The carriage pillar and the carriage platform may be configured to translate the pitch motion to another plane/level (e.g., a lower plane/level) underneath the yoke. Translating the pitch motion (e.g., linear movement) downwards may enable space in front of the yoke to be physically free while still providing components that may measure the physical pitch movement on the lower plane/level below the yoke. For example, the space that may be physically free in front of the input controller may be used to place a monitor.

In some embodiments, a lead screw and/or other adjustment mechanism may be configured to adjust a tensioning of the pitch and/or an overall resistance force on the yoke in both pitch directions. For example, an adjustable tensioner may be implemented that may vary an amount of resistance to movement of the yoke. The resistance tensioning may affect a force feedback effect provided by the input controller. For example, altering the center resting position of the yoke may affect the force feedback provided by the simulator when the aircraft is out of trim.

The linear movement mechanism may comprise a rail and/or a linear motion tube. In some embodiments, two rails may be implemented on either side of the input controller. In some embodiments, a single rail may be implemented (e.g., a wide rail). The linear movement mechanism may enable a pitch input (e.g., pulling backwards and pushing forwards of the yoke for fore/aft control). The pitch input may be sensed using a rack and pinion arrangement. A gear on the carriage platform may rotate an encoder shaft as the carriage slides forward or backward along a rack (e.g., a linear gear). A voltage output of the encoder may be used to define a physical front/back position of the carriage platform and yoke assembly. A hall effect sensor (or other sensor) may be used to detect the center positions for pitch and/or roll. Additional sensors can be used to detect the mechanical extremes of each position (e.g., for a force feedback implementation).

The input controller may be configured to measure a rotary motion of the yoke controller. The rotary motion may be translated to a roll input for the flight simulator. The rotary motion of the roll input may be measured using one or more of a potentiometer, an optical encoder, hall effect encoders, etc. For example, a sensor for measuring the roll may be connected to a shaft on the yoke controller. The rotary position may be sensed based on a voltage output from an encoder.

Positions for the linear movement and the rotary movement may be output from the sensors as different voltages. For example, one voltage value may uniquely correspond to a physical rotation of the yoke and another voltage value may uniquely correspond to a physical location of the carriage platform. The voltages representing the positions (e.g., rotation and fore/aft) may be communicated to a computer running a flight simulation program, which may control the aircraft that is being simulated. The yoke position information may be repeatedly sent to the simulator software such that the input may be updated in a timely manner to influence the response/behavior of the simulated aircraft.

Referring to FIG. 1, a diagram illustrating an example embodiment of the present invention is shown. An example flight simulation configuration 50 is shown. The flight simulation configuration 50 may be an example arrangement of various components for implementing flight simulation hardware and/or software for a single user (e.g., a simmer). In one example, the flight simulation configuration 50 may be used for professional pilot training (e.g., at a training school). In another example, the flight simulation configuration 50 may be used in a home (e.g., a recreational flight sim user). The type of location and/or the use case scenario for the flight simulation configuration 50 may be varied according to the design criteria of a particular implementation.

The flight simulation configuration 50 may comprise a block (or circuit) 52, a monitor (or display) 54, a monitor (or display) 56, a block (or circuit) 60, cabling 62a-62c and/or a block (or circuit or apparatus) 100. The circuit 52 may be a computing device. For example, the computing device 52 may be a personal computer (e.g., a computer running an operating system such as Windows, MacOS, Linux, Android, IOS, ChromeOS, etc.). The monitor 54 may be an instrument display. The monitor 56 may be a scenery display. The circuit 60 may comprise computer hardware (e.g., motherboard, processor, memory, video card, sound card, etc.) configured to execute flight simulator software. The cables 62a-62c may be configured to provide a physical connection between the computing device 52 and the instrument display 54, the scenery display 56, the apparatus 100 and/or other components (not shown). The particular components and/or the arrangement of the various components of the flight simulation configuration 50 may be varied according to the design criteria of a particular implementation.

The apparatus 100 may implement an input controller. The apparatus 100 may comprise an input controller for generating user input for the flight simulator software 60. The apparatus 100 may be implemented to replicate and/or approximate a cockpit yoke of an aircraft. In the example shown, the apparatus 100 may be implemented as a dual-grip design. In another example, the apparatus 100 may be implemented as a single-grip (e.g., joystick) design. Generally, the apparatus 100 may be designed to imitate a yoke for a particular model of aircraft (e.g., the aircraft being simulated by the flight simulator software 60). The particular size and/or shape of the apparatus 100 may be varied according to the design criteria of a particular implementation.

The instrument display 54 may be connected to the computing device 52 (e.g., via the cable 62b). The instrument display 54 may be configured to output a digital display version of gauges, dials and/or an instrument panel of the particular aircraft being simulated by the flight simulator software 60. In one example, the simulated aircraft may be the Cessna 172. In another example, the simulated aircraft may be the Piper PA28. In yet another example, the simulated aircraft may be the SkyDesigns Sky-4 Cloud Trekker. In some embodiments, the flight simulator software 60 may provide the instrument display information on a single monitor. However, implementing the instrument display 54 as a separate display location for the instrument display information may provide a more immersive experience for the user. For example, the instrument display 54 may be positioned at a location that approximates the actual location of the instrument panel in the real-world equivalent of the aircraft being simulated. For pilot training, positioning the instrument display 54 at a location that approximates the real-world equivalent location of the instrument panel may train muscle-memory and/or reinforce to the user where to look while flying. In the example shown, the instrument display 54 may be implemented. In some embodiments, an instrument panel module may be implemented instead of an instrument panel on a display. For example, a module implementing physical controls for the instrument panel may be implemented. The particular aircraft being simulated may be varied according to the design criteria of a particular implementation.

The scenery display 56 may be connected to the computing device 52 (e.g., via the cable 62a). The scenery display 56 may be configured to output a digital display version of scenery generated by the flight simulator software 60. In some embodiments, the scenery content and the instrument panel may be displayed on a single monitor. However, implementing the instrument display 54 separate from the scenery display 56 may provide a more immersive experience for the user. For example, the scenery display 56 may be positioned at a location that approximates a location of the cockpit windshield in the real-world equivalent of the aircraft being simulated. In the example shown, the scenery may be provided on a single monitor. In another example, the scenery display 56 may be a curved monitor (e.g., a display that may more accurately represent the shape of the cockpit windshield and/or provide a wide angle view). In yet another example, the scenery display 56 may be implemented using multiple monitors (e.g., a three-monitor setup with a forward view and two side views). The particular arrangement of the scenery display 56 may be varied according to the design criteria of a particular implementation.

The flight simulator software 60 may be configured to simulate flying an aircraft. For example, an end user may select a specific aircraft to fly, select a location to fly, select weather, etc. and/or have particular options randomly selected. The flight simulator software 60 may enable the end user to take off, fly, and/or land the simulated aircraft. The locations provided by the flight simulator software 60 may be computer generated representations of real-world locations. In some embodiments, the flight simulator software 60 may generate locations that are not necessarily real-world locations (e.g., a made up video game world). The flight simulator software 60 may be configured to receive input (e.g., from a keyboard, a mouse, a game controller, the apparatus 100, etc.) that may be used to control the simulated aircraft. The flight simulator software 60 may be configured to generate various types of output (e.g., audio, video, force feedback, etc.). In an example, the force feedback output provided by the flight simulator software 60 may be used to generate vibrations to a game controller, a gaming chair, the apparatus 100, etc. that generally match airplane movements in the simulation. The flight simulator software 60 may be a version of Microsoft Flight Simulator, X-Plane, Aerofly, Prepar3D, etc. For example, the flight simulator software 60 may implement Microsoft Flight Simulator 2020, Microsoft Flight Simulator 2025, X-Plane 12, etc. The particular version and/or features provided by the flight simulator software 60 may be varied according to the design criteria of a particular implementation.

The cables 62a-62c may be configured to communicate data between the computing device 52 and the various peripherals. In the example shown, each of the cables 62a-62c may be connected to one of the instrument display 54, the scenery display 56 and the apparatus 100. In one example, the cables 62a-62b may implement an HDMI protocol, a DisplayPort protocol, a USB protocol, a DVI protocol, etc. The cable 62c may be a USB cable. In some embodiments, the flight simulation configuration 50 may be implemented using wireless communication protocols (e.g., WiFi, Bluetooth, etc.). In some embodiments, one or more of the instrument display 54 and/or the scenery display 56 may be implemented using a virtual reality (VR) and/or augmented reality (AR) headset. The type of connections between the computing device 52 running the flight simulator software 60 and the various peripherals may be varied according to the design criteria of a particular implementation.

In some embodiments, the apparatus 100 may be configured to operate with a mixed reality VR environment for flight simulation. For example, the flight simulation configuration 50 may comprise a VR system that may have a camera monitoring the hands of the simmer operating the apparatus 100. The VR environment may render the hands of the simmer on a simulated version of the yoke and the apparatus 100 in the real world may provide physical control and/or feedback for the simulated version of the yoke. The VR environment may display the cockpit instrument knobs and/or the scenery for the simulated aircraft. For example, the mixed reality VR environment may accurately render the simulated cockpit with reference to the apparatus 100 to provide a pass through (e.g., where a window of the physical space is not VR generated but a select portion of the physical space provided a mixed reality VR environment). The combination of the apparatus 100 and the VR environment may enable natural hand-eye coordination and/or facilitate muscle memory to assist in a training experience for the simmer (e.g., without requiring a wand or virtual hands). The relationship between the VR environment and the apparatus 100 may be varied according to the design criteria of a particular implementation.

The apparatus 100 may implement the input controller with a short linear movement mechanism. The apparatus 100 may be configured to generate output and/or receive input. The output from the apparatus 100 may comprise data signals (e.g., pitch and roll controls for the flight simulator software 60). In some embodiments, the apparatus 100 may comprise one or more buttons that may be used to provide other types of input than for steering the simulated aircraft (e.g., a pause/resume button, general operating system input, weapons launch input, game-specific controls, macros, etc.). In some embodiments, the input generated by the apparatus 100 may be specific to the flight simulator software 60. In some embodiments, the input generated by the apparatus 100 may be recognized as general input for the operating system (e.g., Y-axis input, X-axis input, input 0, input 1, etc.) and a controller driver may be provided to calibrate the input for the flight simulator software 60 and/or the flight simulator software 60 may map the controller input to particular features for controlling the simulated aircraft. An input to the apparatus 100 may comprise force feedback instructions. For example, the apparatus 100 may be configured to receive the force feedback instructions from the flight simulator software 60 and translate the force feedback instructions to vibration patterns that may be felt by a user holding the apparatus 100.

A dashed reference line 102 is shown. The dashed reference line 102 may represent a height (or plane or level) of the apparatus 100 with respect to the instrument display 54. The flight simulation configuration 50 may be arranged with a bottom (e.g., a stationary platform) of the apparatus 100 at the height level 102 of the instrument display 54. The shape and/or movement of the apparatus 100 may enable the apparatus 100 to move forward and backwards (e.g., linear movement and/or fore/aft movement) to provide a pitch input to the flight simulator software 60. The shape and/or movement of the apparatus 100 may enable the apparatus 100 to be placed at the height 102 level with respect to the instrument display 54. The height level 102 may be an authentic location of a yoke with respect to the instrument panel in a cockpit of a real-world equivalent aircraft. The shape and/or movement of the apparatus 100 may enable the flight simulation configuration 50 to have a similar arrangement of the apparatus 100 with respect to the instrument display 54 and/or the scenery display 56 to provide an authentic flight simulation experience. For example, implementing the apparatus 100 at the height level 102 may enable the yoke of the apparatus 100 to be placed where a yoke belongs relative to the instrument display 54. An input controller that uses a long shaft to measure pitch input may be incapable of being placed at the same location at the height level 102 as shown for the apparatus 100 (e.g., the long shaft of the input controller may physically occupy the space where the instrument display 54 should be located at the height level 102).

In the example shown, the apparatus 100 is shown at the height level 102. The height level 102 may be a predetermined height for the apparatus 100 with respect to the instrument display 54 that may match a real world height of a cockpit yoke to instrument gauges of an airplane being simulated. In some embodiments, the height level 102 may be an adjustable height. For example, different aircrafts being simulated may have different heights for the cockpit yoke with respect to the instrument gauges. The size, shape and/or movement design of the apparatus 100 may enable flexibility when placing the apparatus 100 with respect to the instrument display 54. For example, since the apparatus 100 may comprise a short linear movement mechanism (e.g., implemented without a long shaft), the apparatus 100, the instrument display 54 and the scenery display 56 may be arranged in various locations. The particular height of the apparatus 100 with respect to the instrument display 54 and/or the scenery display 56 may be varied according to the design criteria of a particular implementation.

Figure 2:
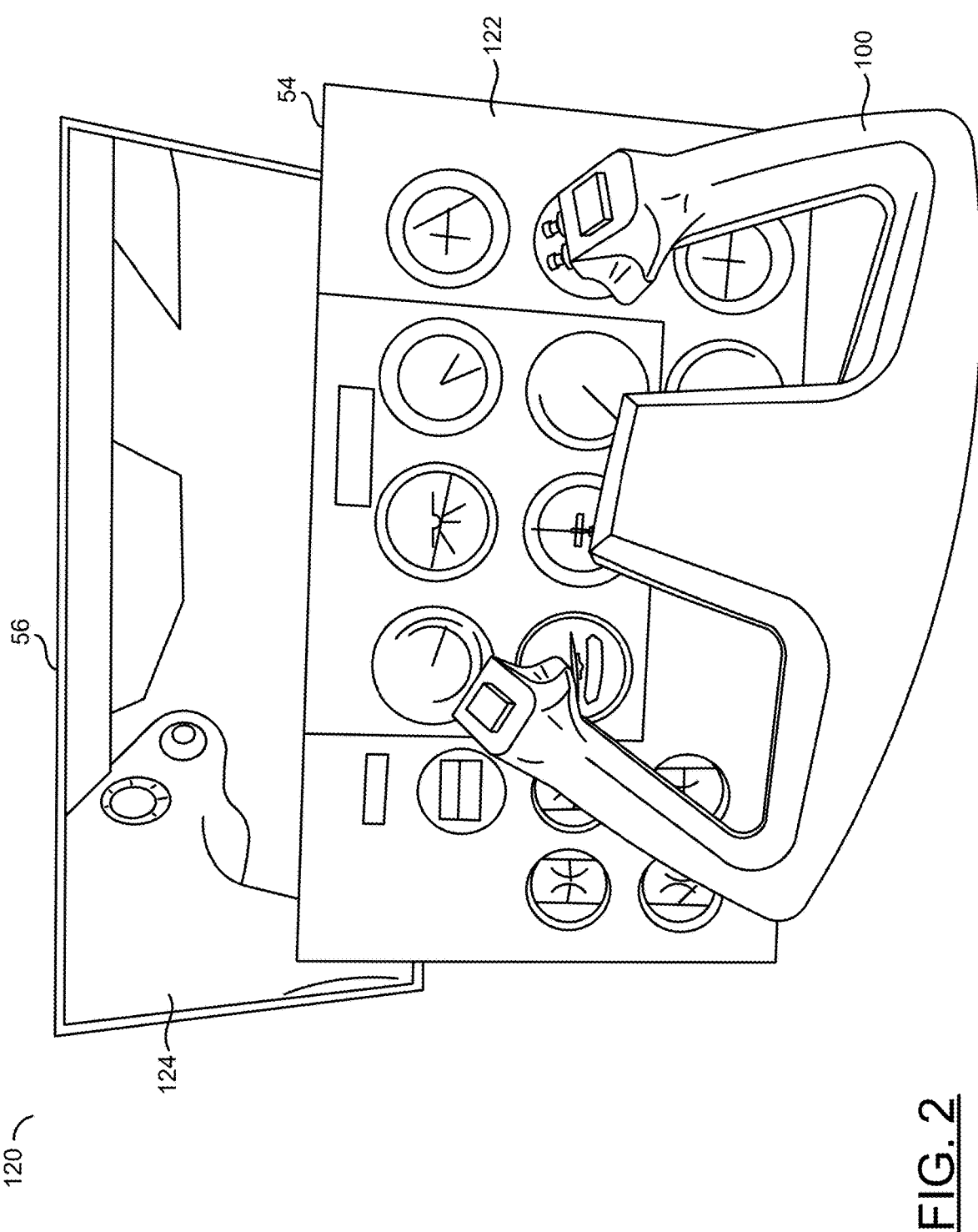
FIG. 2 is a diagram illustrating a first person perspective of an embodiment of the present invention in front of an instrument panel display and a flight simulator display.

Referring to FIG. 2, a diagram illustrating a first person perspective of an embodiment of the present invention in front of an instrument panel display and a flight simulator display is shown. A perspective 120 is shown. The perspective 120 may be a first-person perspective of a user (e.g., a simmer) piloting an aircraft in the flight simulator software 60 using the flight simulation configuration 50. The first-person perspective 120 may comprise a view of the apparatus 100, the instrument display 54 and the scenery display 56.

The apparatus 100 may be located in front of the instrument display 54. The scenery display 56 may be located behind the instrument display 54. The apparatus 100 may receive input from the user (e.g., a pitch input from linear movement, a roll input from rotary movement and/or other input using various buttons). At least the roll input and the pitch input may be provided to the flight simulator software 60 to control an aircraft being simulated by the flight simulator software 60. In some embodiments, the roll input and the pitch input may be received by an operating system of the computing device 52, which may be converted using an API (e.g., DirectInput, XInput, evdev, SDL, libinput, etc.) to provide various functions at the operating system level and/or to provide various functions to the flight simulator software 60. The particular method, drivers, firmware and/or software used for providing input from the apparatus 100 to the flight simulator software 60 may be varied according to the design criteria of a particular implementation.

The instrument display 54 may output video content 122. The video content 122 may comprise simulated instrument gauges. The simulated instrument gauges 122 may provide a visual representation of data about the aircraft being simulated. The simulated instrument gauges 122 may be generated by the flight simulator software 60. The simulated instrument gauges 122 may provide information that may be provided on an instrument panel of an aircraft to a pilot. For example, for a user training to pilot an aircraft using the flight simulator software 60, having the simulated instrument gauges 122 accurately located may be important for developing muscle memory and/or eye memory in order to quickly and accurately respond when flying the real-world equivalent aircraft. The apparatus 100 may be located in front of the instrument display 54. Locating the apparatus 100 in front of the instrument display 54 may provide an authentic location for the apparatus 100 with respect to the simulated instrument gauges 122. For example, locating an input controller farther away from the instrument display 54 (e.g., to accommodate a long linear shaft for measuring pitch movement) may result in an improper location of the yoke with respect to the simulated instrument gauges 122. In one example, the simulated instrument gauges 122 may display information that may be displayed to a pilot in a real-world cockpit such as altitude, engine status, speed, etc. The type of information provided by the simulated instrument gauges 122 may be varied according to the design criteria of a particular implementation.

The scenery display 56 is shown at a location beyond the apparatus 100 and the instrument display 54. In the example shown, the scenery display 56 is located partially behind the instrument display 54. The scenery display 56 may output video content 124. The video content 124 may comprise a visual representation of simulated scenery. For example, the simulated scenery 124 may provide a simulated view of the simulated world outside of the simulated cockpit. The simulated scenery 124 may be generated by the flight simulator software 60. The simulated scenery 124 may be generated in response to the location and/or movement of the simulated aircraft. For example, as the user provides input to the flight simulator software 60 using the apparatus 100, the flight simulator software 60 may update the simulated scenery 124 in real-time in order to represent where the simulated aircraft is located in the simulated world. Similarly, as the conditions change in the simulated scenery 124 and/or the movement of the aircraft changes (e.g., due to input from the user and/or simulated conditions such as wind speed, weather, temperature, etc.) the simulated instrument gauges 122 may update to provide readings for the pilot and/or feedback (e.g., rumble effects and/or resistance adjustments) may be provided to the apparatus 100. The type of scenery and/or the quality of the scenery (e.g., resolution, frame rate, level of realism, etc.) provided by the simulated scenery 124 may be varied according to the design criteria of a particular implementation.

The simulated scenery 124 may comprise a partial view of a simulated cockpit and a view outside of the simulated aircraft. In some embodiments, the simulated instrument gauges 122 may be part of the interior view of the cockpit, which may align seamlessly with the simulated scenery 124. For example, the instrument display 54 may be arranged with respect to the scenery display 56 to provide a seamless stitched display of the video content generated by the flight simulator software 60. Many simmers may use multiple monitors to create a panoramic scenery view several feet away from the cockpit. The user may arrange the multiple monitors to be accurately located for a particular type of aircraft being simulated. Without implementing the apparatus 100 (e.g., with the short linear movement for pitch input), placing the multiple monitors for a seamless recreation of the cockpit may be impractical (e.g., the simulated scenery 124 may be too far away, which may reduce an amount of immersion and/or may prevent appropriate stitching between the video content of the multiple displays).

Figure 3:
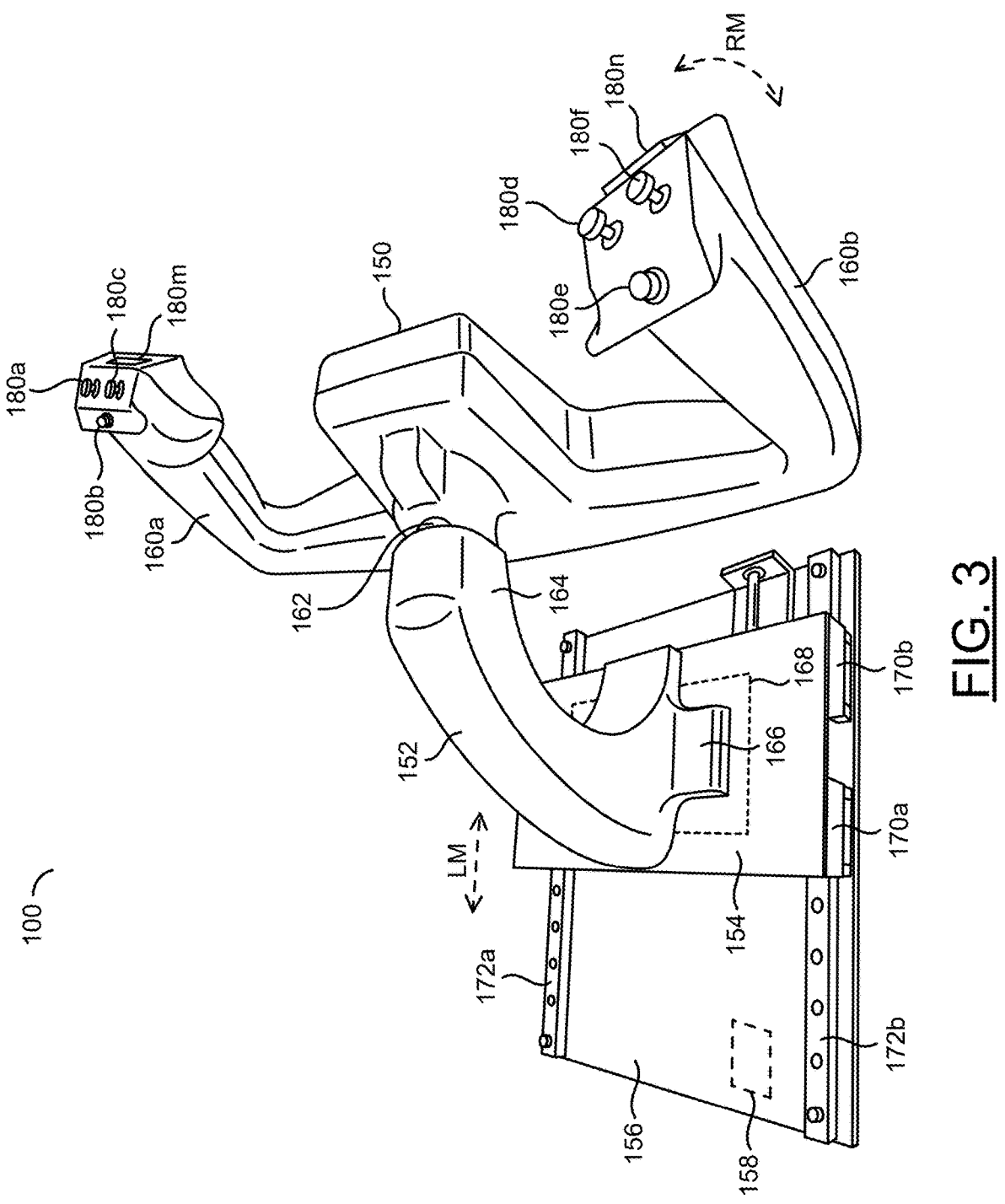
FIG. 3 is a diagram illustrating an example embodiment of a control yoke attached to a carriage pillar and a carriage platform moving on a stationary platform.

Referring to FIG. 3, a diagram illustrating an example embodiment of a control yoke attached to a carriage pillar and a carriage platform moving on a stationary platform is shown. The apparatus 100 is shown. The apparatus 100 is shown isolated from the flight simulation configuration 50 for clarity. The particular design of the apparatus 100 shown may be one example representation of the components of the apparatus 100. The particular implementation of the various components may be varied according to the design criteria of a particular implementation.

The apparatus 100 may comprise a control yoke 150, a carriage pillar 152, a carriage platform 154, a stationary platform 156 and/or a block (or circuit) 158. The control yoke 150 may be connected to the carriage pillar 152. The control yoke 150 may rotate with respect to the carriage pillar 152 to provide a rotary movement for the roll input. The carriage pillar 152 may be connected to the carriage platform 154. The carriage pillar 152 may be stationary on the carriage platform 154. For example, the carriage pillar 152 may provide a stable support for the control yoke 150 on the carriage platform 154. The carriage pillar 152 may be configured to translate and/or transfer a forward and backwards force by the user on the control yoke 150 downwards to the carriage platform 154.

The carriage platform 154 may be connected to the stationary platform 156. The carriage platform 154 may be configured to move linearly with respect to the stationary platform 156. For example, the forward and backwards forces translated down to the carriage platform 154 by the carriage pillar 152 may move the carriage platform 154 linearly (e.g., fore/aft) with respect to the stationary platform 156. In one example, the carriage platform 154 may glide along the stationary platform 156. The stationary platform 156 may provide support for the apparatus 100. For example, the stationary platform 156 may be placed on a surface (e.g., a table or a desk) and the stationary platform 156 may sit flat on the surface without movement. The carriage platform 154 may move with respect to the stationary platform 156 but the stationary platform 156 should not also move. The stationary platform 156 may generally comprise various components that may measure the linear movement of the carriage platform 154. However, the components that measure the linear movement of the carriage platform 154 and/or translate the linear movement into a pitch input may be mounted at various places of the apparatus 100 (e.g., on the carriage platform 154, the carriage pillar 152 and/or in the control yoke 150).

The control yoke 150 may comprise a grip. In the example shown, the control yoke 150 may comprise grips 160a-160b (e.g., a dual grip design). In some embodiments, the grip may be implemented as a single-grip design (e.g., a joystick style grip for one hand). The grips 160a-160b may be shaped to enable the simmer to grab onto the control yoke 150 with two hands. The grips 160a-160b may facilitate a rotary movement of the control yoke 150 (e.g., provide an ergonomic shape for the simmer to rotate the control yoke 150). The particular size and/or shape of the grips 160a-160b may be varied according to the design criteria of a particular implementation.

The control yoke 150 may comprise a yoke shaft 162. The yoke shaft 162 is shown extending from a center of the control yoke 150 to a top of the carriage pillar 152. The yoke shaft 162 may extend from the control yoke 150 to the carriage pillar 152. The yoke shaft 162 may enable a rotation of the control yoke 150. For example, the control yoke 150 may pivot and/or rotate about the yoke shaft 162. A rotation of the yoke shaft 162 may be measured using a sensor and/or an encoder provided by the circuit 158. The rotation of the yoke shaft 162 may be converted to the roll input. The simmer may rotate the control yoke 150 using the grips 160a-160b and the yoke shaft 162 may enable the rotational movement of the control yoke 150. In the example shown, the yoke shaft 162 may be exposed (e.g., to provide a visual representation). In another example, the yoke shaft 162 may be covered and/or enclosed by a portion of the control yoke 150 and/or the carriage pillar 152. In some embodiments, the yoke shaft 162 may comprise a bearing and/or ball bearings to facilitate rotation. In some embodiments, the yoke shaft 162 may comprise a circular gear. The particular design of the yoke shaft 162 may be varied according to the design criteria of a particular implementation.

The carriage pillar 152 may comprise a carriage receptacle 164 and/or a pillar base 166. The carriage receptacle 164 may be configured to attach to the yoke shaft 162. For example, the carriage receptacle 164 may receive the yoke shaft 162 from the control yoke 150. In one example, the carriage receptacle 164 may provide a socket and/or an anchor point for the yoke shaft 162. The carriage receptacle 164 may hold one end of the yoke shaft 162 and the control yoke 150 may comprise a receptacle at another end of the yoke shaft 162 to prevent the control yoke 150 from separating from the carriage pillar 152. The carriage receptacle 164 may enable the yoke shaft 162 to rotate within the carriage receptacle 164. In some embodiments, the carriage receptacle 164 may comprise circuitry (e.g., one or more components of the circuit 158 such as a sensor, an encoder, a processor, etc.) that may enable a measurement of the amount of rotation of the yoke shaft 162. The circuitry may convert the amount of rotation of the yoke shaft 162 to a voltage level, which may provide the roll input for the apparatus 100.

The pillar base 166 may be a bottom end of the carriage pillar 152. The pillar base 166 may be configured to connect to the carriage platform 154. The pillar base 166 may hold the carriage pillar 152 on the carriage platform 154 as the carriage platform 154 moves. In one example, the pillar base 166 may be fastened (e.g., using a number of screws) to the carriage platform 154. In another example, the pillar base 166 may snap and lock into the carriage platform 154. In the example shown, the pillar base 166 may be implemented as a surface that may sit flat on the carriage platform 154. In some embodiments, the pillar base 166 may be implemented as a fin and/or a number of fins that may be inserted into the carriage platform 154. The particular method of connecting the carriage pillar 152 to the carriage platform 154 using the pillar base 166 may be varied according to the design criteria of a particular implementation.

In the example shown, the carriage pillar 152 may have a slightly curved shape. In another example, the carriage pillar 152 may extend straight down to the carriage platform 154. In yet another example, the carriage pillar 152 may have an upside down L shape. The carriage pillar 152 may extend a length down from the carriage receptacle 164 to the pillar base 166. The length may provide an amount of clearance height between the control yoke 150 and the carriage platform 154 (or the stationary platform 156) to enable a rotation of the control yoke 150 at all available angles of rotation. In the example shown, the control yoke 150 may have a longer width than height. For example, at no rotation (e.g., as shown) there may be more space between the control yoke 150 and the stationary platform 156 and at a 90 degree rotation (e.g., turned to the left or the right) such that one of the grips 160a-160b is above the other of the grips 160a-160b, there may be less space between the control yoke 150 and the stationary platform 156. The height of the carriage pillar 152 may be a length that provides sufficient space to rotate the control yoke 150 over a range of rotation (e.g., the range of rotation may be less than 90 degrees) without the control yoke 150 colliding with the carriage platform 154 and/or the stationary platform 156. The particular height and/or shape of the carriage pillar 152 may be varied according to the design criteria of a particular implementation.

A dashed box 168 is shown. The dashed box 168 may represent a fastening portion of the carriage platform 154. The carriage platform 154 may comprise the fastening block (or fastening portion) 168 and/or rail risers 170a-170d. The fastening block 168 may be implemented with one or more platform sockets (not visible in the perspective shown). The fastening block 168 may enable a connection to the pillar base 166 of the carriage pillar 152 to the carriage platform 154. For example, the fastening block 168 may be implemented on an underside of the carriage platform 154 to enable the carriage pillar 152 to securely attach to the carriage platform 154.

The carriage platform 154 may comprise one or more of the rail risers 170a-170d. In the perspective shown, rail risers 170a-170b may be visible. The rail risers 170a-170d may be configured to attach the carriage platform 154 to the stationary platform 156. The rail risers 170a-170d may be further configured to enable the carriage platform 154 to move with respect to the stationary platform 156. For example, the rail risers 170a-170d may slide along the stationary platform 156. In the example shown, the rail risers 170a-170b may be visible on one side of the carriage platform 154 and another two rail risers 170c-170d (not visible from the perspective shown) may be located on an opposite side of the carriage platform 154. The rail risers 170a-170d may be arranged to maintain a level surface for the carriage platform 154 while the carriage platform 154 moves along the stationary platform 156. In some embodiments, a single rail riser 170a may be implemented. The number of the rail risers 170a-170d implemented may be varied according to the design criteria of a particular implementation.

The stationary platform 156 may comprise a rail (or rails). In the example shown, the stationary platform 156 may comprise two rails 172a-172b. The rails 172a-172b may be configured to connect to the rail risers 170a-170d of the carriage platform 154. In the example shown, the two rail risers 170a-170b may be attached to the rail 172b and the rail 172a may attach to two other rail risers 170c-170d (not visible from the perspective shown) of the carriage platform 154. The rails 172a-172b may be configured to enable a linear movement of the carriage platform 154. For example, the rail risers 170a-170b may slide along the rails 172a-172b. The rails 172a-172b may provide a restricted straight path of movement for the rail risers 170a-170b. In some embodiments, the stationary platform 156 may be implemented with a single rail 172a. For example, the single rail 172a may be attached to the single rail riser 170a. The number, length and/or width of the rails 172a-172b may be varied according to the design criteria of a particular implementation.

A dashed curved double-ended arrow (e.g., RM) is shown near the control yoke 150 and a dashed double-ended arrow (e.g., LM) is shown near the carriage platform 154. The dashed arrow RM may represent a rotation movement of the control yoke 150. The dashed arrow LM may represent a linear movement of the carriage platform 154. In one example, the simmer may turn and/or rotate the control yoke 150 using the grips 160a-160b and the yoke shaft 162 may rotate the control yoke 150 to provide the rotation movement RM of the apparatus 100. In another example, the simmer may push forward or pull backwards on the control yoke 150 using the grips 160a-160b and the carriage pillar 152 may transfer the force downwards to the carriage platform 154. The rail risers 170a-170b may slide along the rails 172a-172b to enable the carriage platform 154 to provide the linear movement LM (e.g., fore/aft movement) of the carriage platform 154 with respect to the stationary platform 156.

The rotation movement RM may have a range of rotation of the control yoke 150. In the perspective shown, the rotation movement RM may be zero (or neutral). In the neutral position, the grips 160a-160b may be horizontally aligned. In some embodiments, the range of rotation for the rotation movement RM may be a maximum of 90 degrees in each direction (e.g., 90 degrees clockwise with the grips 160a-160b vertically aligned with the grip 160b above the grip 160a and 90 degrees counterclockwise with the grips 160a-160b vertically aligned with the grip 160a above the grip 160b). In some embodiments, the range of rotation for the rotation movement RM may not have a limitation (e.g., the yoke shaft 162 may enable the control yoke 150 to spin in either direction without stopping and the circuit 158 may measure the amount of rotation). In some embodiments, the range of rotation for the rotation movement RM may be an amount less than 90 degrees. For example, the range of rotation for the control yoke 150 may be approximately 75 degrees in each direction. In some embodiments, the range of rotation for the rotation movement RM may be limited based on the particular aircraft the apparatus 100 may be used to simulate. In an example, the flight simulator software 60 may provide feedback that may prevent an amount of the rotation movement RM based on the aircraft selected for simulation and/or conditions (e.g., weather, wind, aircraft orientation, simulated forces acting on the aircraft, etc.) in the flight simulator software 60. The particular range of rotation for the rotation movement RM may be varied according to the design criteria of a particular implementation.

The linear movement LM may be limited based on a length of the rails 172a-172b. In some embodiments, the length of the rails 172a-172b may be selected based on an aircraft that the apparatus 100 may be designed to simulate. In some embodiments, the usable length of the rails 172a-172b may be adjustable. For example, stoppers may be added to the rails 172a-172b that may prevent the rail risers 170a-170d from traveling the entire length of the rails 172a-172b (e.g., to adjust a range of the linear movement LM for a particular aircraft being simulated). In some embodiments, a tensioner may be adjusted to prevent the linear movement LM moving beyond a particular range. For example, increased tension may be applied to the tensioner to prevent the carriage platform 154 moving beyond a predefined range for the linear movement LM. In some embodiments, the flight simulator software 60 may provide feedback that may result in the increase in tension that may limit the range for the linear movement LM in response to various conditions in the flight simulator software 60 (e.g., aircraft selected). The particular range for the linear movement LM implemented may be varied according to the design criteria of a particular implementation.

The apparatus 100 may further comprise the circuit 158. The circuit 158 may comprise a processor and/or a number of sensors/encoders. The circuit 158 is shown as a block on the stationary platform 156 as a representative example.

However, the circuit 158 may be distributed throughout the apparatus 100. In an example, the circuit 158 may be mounted to the carriage platform 154, the carriage pillar 152 and/or the control yoke 150. The circuit 158 may be configured to measure the rotation movement RM of the control yoke 150. The circuit 158 may be configured to translate the rotation movement RM to a roll input. The circuit 158 may be configured to detect the linear movement LM of the carriage platform 154 along the rails 172a-172b. The circuit 158 may be configured to translate linear movement LM of carriage platform 154 to a pitch input. The circuit 158 may present the pitch input and the roll input to the computing device 52 and/or the flight simulator software 60.

Buttons 180a-180n are shown on the control yoke 150. In the example shown, the buttons 180a-180c and the button 180m may be implemented on the grip 160a and the buttons 180d-180f and the button 180n may be implemented on the grip 160b. The circuit 158 may be configured to receive input from the buttons 180a-180n. The buttons 180a-180n may provide various functionality as defined by the operating system of the computing device 52 and/or the flight simulator software 60. The particular function of each of the buttons 180a-180n and/or the arrangement of the buttons 180a-180n may be varied according to the design criteria of a particular implementation.

The components of the apparatus 100 (e.g., the control yoke 150, the carriage pillar 152, the carriage platform 154 and/or the stationary platform 156) may be implemented using one or more materials. In one example, the components of the apparatus 100 may be implemented using an aluminum composite material. In another example, components of the apparatus 100 may be implemented using a metal material. In yet another example, components of the apparatus 100 may be implemented using a wood material. In still another example, components of the apparatus 100 may be implemented using a plastic material. The type of material used to implement one or more of the components of the apparatus 100 may be varied according to the design criteria of a particular implementation.

Figure 4:
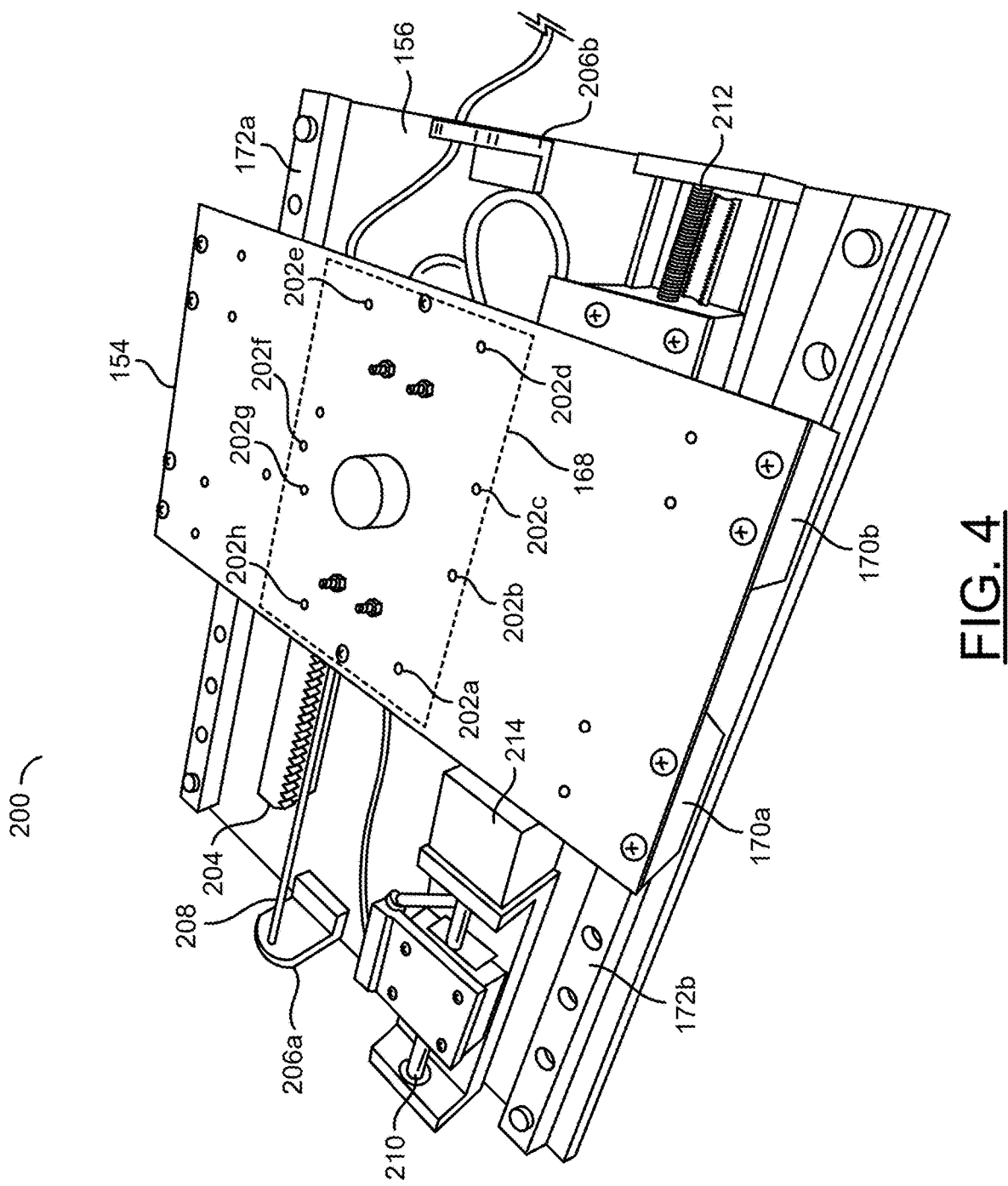
FIG. 4 is a diagram illustrating an example embodiment of a carriage platform and a stationary platform.

Referring to FIG. 4, a diagram illustrating an example embodiment of a carriage platform and a stationary platform is shown. A perspective view 200 is shown. The perspective view 200 may comprise a view of a portion of the apparatus 100. The portion of the apparatus 100 may comprise the carriage platform 154 and the stationary platform 156. In the partial perspective view 200, the apparatus 100 is shown without the control yoke 150 and the carriage pillar 152 for illustrative purposes.

The carriage platform 154 is shown on the stationary platform 156. For example, the rail risers 170a-170b are shown on the rail 172b. Similarly, rail risers on the opposite end of the carriage platform 154 may be on the rail 172a. Using the rails 172a-172b for guidance, the carriage platform 154 may move linearly along the stationary platform 156. The rail risers 170a-170d and the rails 172a-172b may provide a short linear movement mechanism for the apparatus 100.

The carriage platform 154 may comprise the fastening block 168. From the partial perspective view 200, the fastening block 168 may be shown as a dashed box. For example, the fastening block 168 may be implemented on an underside of the carriage platform 154. A number of platform sockets 202a-202h are shown. The platform sockets 202a-202h may be provided by the fastening block 168. The platform sockets 202a-202h may be configured to attach to the pillar base 166 of the carriage pillar 152. In the example shown, the platform sockets 202a-202h may be through holes. For example, the pillar base 166 may be screwed into the through holes of the platform sockets 202a-202h of the fastening block 168 to secure the carriage pillar 152 to the carriage platform 154. The platform sockets 202a-202h may enable the carriage pillar 152 to be connected through the carriage platform 154 to the fastening block 168. The platform sockets 202a-202h may be configured to accept a portion of the pillar base 166 and/or a fastening mechanism (e.g., a screw, a clip, a rivet, etc.) to enable a secure attachment of the carriage pillar 152 to the carriage platform 154.

The fastening block 168 may enable a force to be applied to the control yoke 150 (e.g., the rotation force RM and/or the linear force LM) and/or transferred downwards along the carriage pillar 152 to enable the linear movement LM of the carriage platform 154 along the stationary platform 156 without additional movement of the carriage pillar 152. For example, the carriage pillar 152 may be locked in place on the carriage platform 154 by the fastening block 168 and the carriage pillar 152 and the control yoke 150 may move together with the carriage platform 154. The platform sockets 202a-202h may be configured to enable an attachment of the carriage pillar 152 to the fastening block 168 from a top side of the carriage platform 154, without additionally attaching the carriage pillar 152 to the stationary platform 156. The number of the platform sockets 202a-202h and/or the type of the platform sockets 202a-202h may be varied according to the design criteria of a particular implementation.

The stationary platform 156 may comprise a stationary rack 204, brackets 206a-206b and/or a tensioner 208. The stationary rack 204, the brackets 206a-206b and/or the tensioner 208 may be configured to affect and/or measure the movement of the stationary platform 156.

The stationary rack 204 may be part of a sensor and/or encoder system that may determine the amount of the linear movement LM of the carriage platform 154. The stationary rack 204 may be configured to connect to a component on an underside of the carriage platform 154. In the example shown, the stationary rack 204 may be implemented as a linear gear (e.g., a rack of a rack and pinion system). In another example, the stationary rack 204 and/or the rails 172a-172b may be implemented as a linear motion tube. The combination of components used to guide the movement and/or measure the movement of the carriage platform 154 may be varied according to the design criteria of a particular implementation.

The brackets 206a-206b may be implemented on each end of the carriage platform 154. The tensioner 208 may be attached to the brackets 206a-206b. The brackets 206a-206b may enable the tensioner 208 to extend across the entire length of the stationary platform 156 and/or the rails 172a-172b. In the example shown, the brackets 206a-206b may be implemented as L brackets. For example, the L shape of the brackets 206a-206b may enable the brackets 206a-206b to attach to both a bottom of the stationary platform 156 and sides of the stationary platform 156 (not shown).

The tensioner 208 may be configured to provide resistance to the movement of the carriage platform 154 and/or prevent the carriage platform 154 from moving without the end-user applying a force to the control yoke 150. The tensioner 208 may be configured to maintain a center position of the carriage platform 154 (e.g., a center position of the entire linear motion range). In some embodiments, the apparatus 100 may comprise a tensioning screw configured to control an amount of resistance provided by the tensioner 208. Generally, the tensioner 208 may be implemented with a resistant selected to be consistent with a real-world counterpart of a cockpit yoke. In the example shown, the tensioner 208 may be implemented as an elastic rope. In another example, the tensioner 208 may be implemented as a rubber band. In yet another example, the tensioner 208 may be implemented as a bungee cord and/or a shock cord. In still another example, the tensioner 208 may be implemented as a spring. The particular type of tensioner 208 and/or the amount of tension provided by the tensioner 208 may be varied according to the design criteria of a particular implementation.

In some embodiments, the stationary platform 156 may comprise a force feedback mechanism. The force feedback mechanism may comprise a lead screw 210, a lead screw 212 and/or a motor 214. The lead screw 210 may be a rear lead screw. The lead screw 212 may be a front lead screw. The designation of 'front' or 'rear' may be to distinguish the lead screws 210-212. However, which screw may be considered at the 'rear' or the 'front' may be varied according to the design criteria of a particular implementation. The motor 214 may be a stepper motor. The stepper motor 214 may be implemented with the rear lead screw 210. In some embodiments, another stepper motor (covered by the carriage platform 154, in the example shown) may be implemented with the front lead screw 212. The number and/or type of the components of the force feedback mechanism may be varied according to the design criteria of a particular implementation.

The force feedback mechanism may be configured to create a change in the distance of the anchor point for the tensioner 208 with respect to the carriage platform 154. The change in distance may relax an equilibrium position of the control yoke 150 that may affect an imbalance in the opposing force created by the tensioner 208 (e.g., similar to a tug of war between two opposing sides, which may affect an ease of movement in one direction or another of the carriage platform 154). The stepper motor 214 may enable the rear lead screw 210 to adjust an amount of tension of the tensioner 208. Similarly, a front stepper motor may enable the front lead screw 212 to adjust an amount of tension on the tensioner 208. Moving the force feedback mechanism may change the resting, untouched position of the yoke. The force feedback mechanism may be further configured to generate vibration in response to feedback from the flight simulator software 60. The vibration may be configured to imitate vibrations and/or other movements that may be caused by external forces of the simulated aircraft that may be cause movement of the cockpit yoke.

Figure 5:
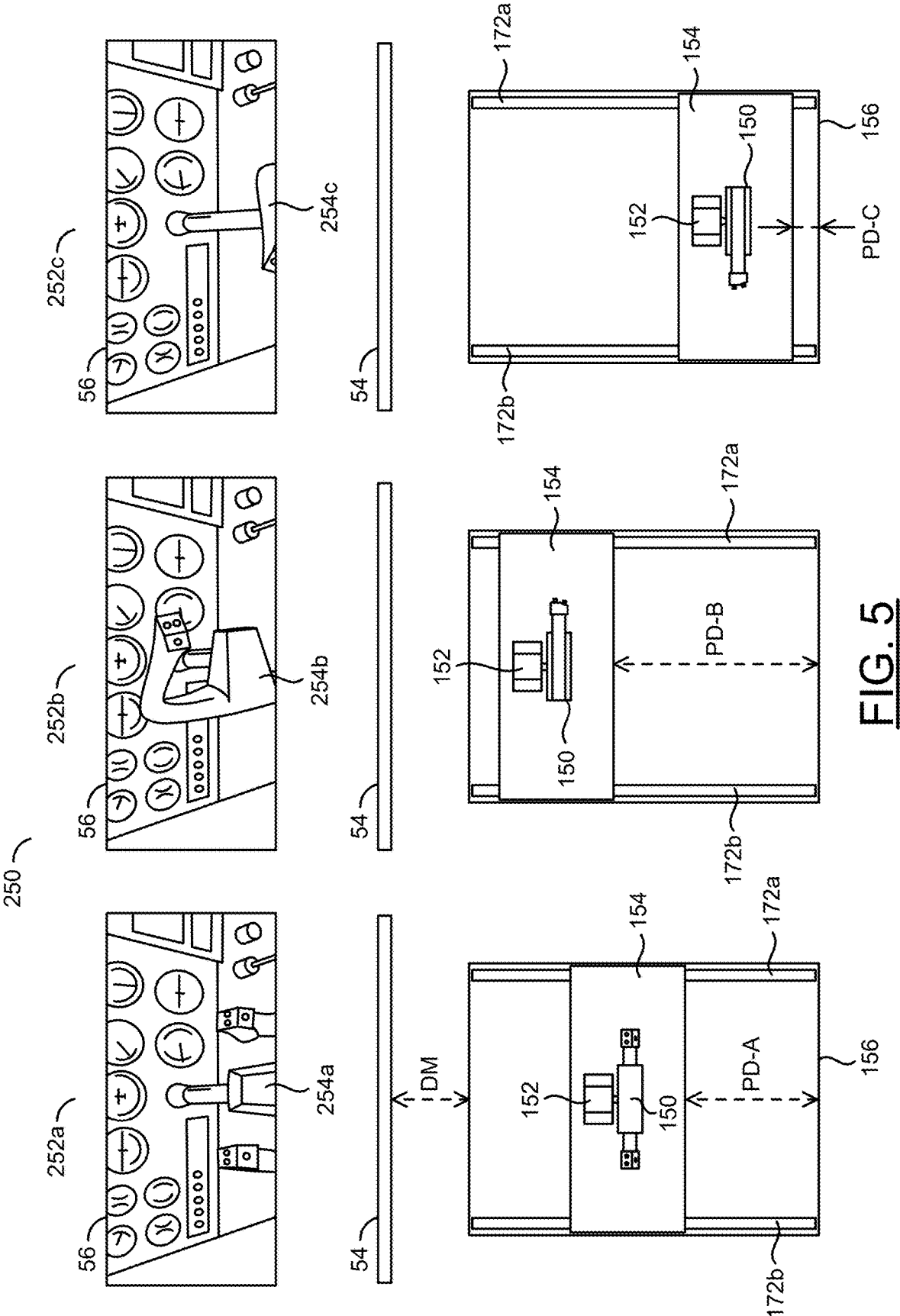
FIG. 5 is a diagram illustrating a movement of a carriage platform and control yoke and an input to a simulator software.

Referring to FIG. 5, a diagram illustrating a movement of a carriage platform and control yoke and an input to a simulator software is shown. An overhead view 250 is shown. The overhead view 250 may provide an illustrative example of different movement positions of the control yoke 150 and/or the carriage platform 154 and the input provided to the flight simulator software 60. The overhead view 250 may comprise three example controller inputs 252a-252c. Each of the controller inputs 252a-252c may represent a different example combination of input to the apparatus 100 by the simmer.

Each of the example controller inputs 252a-252c may comprise the apparatus 100, the instrument display 54 and the scenery display 56. The rails 172a-172b are shown on the stationary platform 156. The control yoke 150 and the carriage pillar 152 are shown on the carriage platform 154. In each of the example controller inputs 252a-252c, the location of the carriage platform 154 and/or the orientation of the control yoke 150 may be different to provide illustrative examples of controller input by the simmer. Each of the example controller inputs 252a-252c may have a corresponding cockpit visualization 254a-254c shown on the scenery display 56 that may be generated by the flight simulator software 60. The cockpit visualizations 254a-254c may provide an example video output of the view of the cockpit and controls generated by the flight simulator software 60. The cockpit visualizations 254a-254c may demonstrate the response of the flight simulator software 60 to the input received by the apparatus 100. The cockpit visualization 254a-254c may be shown for illustrative purposes. For example, generally the simulated scenery 124 displayed on the scenery display 56 may provide a view from the window of the cockpit (or a chase view of the aircraft). Similarly, the overhead views provided by each of the controller inputs 252a-252c may illustrate the scenery display 56 with the screen directed upwards for illustrative purposes to show the cockpit visualization 254a-254c. Generally, the scenery display 56 may have a similar orientation as the instrument display 54 (e.g., with the screen directed towards the simmer sitting behind the apparatus 100).

In the example controller input 252a, a dashed double-ended arrow (e.g., DM) is shown. The arrow DM may represent a controller distance between the apparatus 100 (e.g., the location of the stationary platform 156) and the instrument display 54. The controller distance DM may be a small distance. Since the apparatus 100 may not implement a long shaft and/or because the apparatus 100 is configured to translate the linear motion LM downwards along the carriage pillar 152 to the carriage platform 154, the amount of physical space occupied by the apparatus 100 may be a small footprint. For example, an implementation of a flight sim controller that uses a long shaft may not be able to be placed at the controller distance DM from the instrument display 54. In an example, with the implementation of the carriage platform 154 and the control yoke 150 attached to the carriage platform 154, the stationary platform 156 may implement a shaft (e.g., the carriage pillar 152) that may be long enough to affix the control yoke 150 to the carriage platform 154 and the movement mechanism (e.g., rail risers 170a-170d and the rails 172a-172b) may enable the linear movement LM that may be similar to the real-world aircraft counterpart. For example, if the real-world aircraft counterpart provides a range of linear movement that is a total of 160 mm (e.g., 80 mm forward and 80 mm back from a center/neutral position), then the apparatus 100 may be implemented with the stationary platform 156 that may be 160 mm long to enable the carriage platform 154 to move forward 80 mm and backwards 80 mm from the center/neutral position to cover the full movement range. In some embodiments, the controller distance DM may be zero (e.g., the apparatus 100 may be placed directly in front of and/or abut the instrument display 54. Similarly, the scenery display 56 may be placed close to the instrument display 54 (e.g., directly next to and/or positioned slightly above). The arrangement of the instrument display 54 and the scenery display 56 and the apparatus 100 may be selected to ensure proper video stitching between each of the displays and/or an authentic positioning of the control yoke 150 with respect to the instrument panel of the real-world aircraft counterpart. While the controller distance DM is shown only in the example controller input 252a for illustrative purposes, the controller distance DM may be similar in each of the controller inputs 252a-252c. The particular controller distance DM may be varied according to the design criteria of a particular implementation.

The example controller input 252a may provide an example of the apparatus 100 with the control yoke 150 in the center (or normal or neutral) position. In the example controller input 252a, the carriage platform 154 may be at generally a central position with respect to the stationary platform 156 and the control yoke 150 may be in a neutral position (e.g., no rotational force on the control yoke 150 and no linear force on the control yoke 150). A dashed arrow (e.g., PD-A) is shown. The arrow PD-A may represent a linear distance of the carriage platform 154 with respect to one end of the stationary platform 156 (e.g., the end of the stationary platform 156 that the simmer may be seated at). The linear distance PD-A and the orientation of the control yoke 150 may represent no input force applied by the simmer. For example, the tensioner 208 may set the carriage platform 154 at the central position at the linear distance PD-A.

The linear movement LM input and the rotation movement RM input may be determined by the circuit 158. For example, the circuit 158 may read the linear distance PD-A and the rotary position of the control yoke 150 and translate the values to input readable by the computing device 52 and/or the flight simulator software 60. The cockpit visualization 254a may respond to the input provided by the apparatus 100. The cockpit visualization 254a may generate video output that shows the cockpit yoke with a neutral rotational orientation and the shaft extending from the instrument panel at the center/neutral distance. The cockpit visualization 254a may generally represent the input provided by the control yoke 150 and/or the carriage platform 154 at the linear distance PD-A.

The example controller input 252b may provide an example of the apparatus 100 with the control yoke 150 in the fully pushed forward position. In the example controller input 252b, the carriage platform 154 may be at generally a full forward position with respect to the stationary platform 156 and the control yoke 150 may be turned 90 degrees to the right (e.g., a clockwise rotational force on the control yoke 150 and a forward linear force on the control yoke 150). A dashed arrow (e.g., PD-B) is shown. The arrow PD-B may represent a linear distance of the carriage platform 154 with respect to one end of the stationary platform 156 (e.g., the end of the stationary platform 156 that the simmer may be seated at). The linear distance PD-B may represent a full forward linear input force applied to the control yoke 150 by the simmer. The 90 degree to the right orientation of the control yoke 150 may represent a full right roll rotary input applied to the control yoke 150 by the simmer. For example, if the carriage platform 154 has a distance range of 160 mm, the distance PD-B may be the maximum 160 mm position for the carriage platform 154 (e.g., the distance PD-B is shown from a back end of the carriage platform 154 instead of the front end, which may be approximately 160 mm from the end of the stationary platform 156) and the position of the carriage platform 154 may be 80 mm forward from the center/neutral position. Even at a full forward position for the carriage platform 154, there may be some distance from the end of the stationary platform 156 (e.g., the carriage platform 154 may not necessarily travel the full range of the stationary platform 156 and/or a stop may be implemented to prevent moving to the very end of the stationary platform 156).

The linear movement LM input and the rotation movement RM input may be determined by the circuit 158. For example, the circuit 158 may read the linear distance PD-B and the rotary position of the control yoke 150 and translate the values to input readable by the computing device 52 and/or the flight simulator software 60 (e.g., roll to the right and pitch downwards). The cockpit visualization 254*b* may respond to the input provided by the apparatus 100. The cockpit visualization 254*b* may generate video output that shows the cockpit yoke with a 90 degree right roll rotational orientation and the shaft pushed forward into the instrument panel. For example, the length of the shaft shown in the cockpit visualization 254*b* may be shorter than the length of the shaft shown in the cockpit visualization 254*a*. The cockpit visualization 254*b* may generally represent the input provided by the control yoke 150 and/or the carriage platform 154 at the linear distance PD-B.

The example controller input 252*c* may provide an example of the apparatus 100 with the control yoke 150 in the fully pulled back position. In the example controller input 252*c*, the carriage platform 154 may be at generally a full backward position with respect to the stationary platform 156 and the control yoke 150 may be turned 90 degrees to the left (e.g., a counterclockwise rotational force on the control yoke 150 and a reverse linear force on the control yoke 150). A dashed arrow (e.g., PD-C) is shown. The arrow PD-C may represent a linear distance of the carriage platform 154 with respect to one end of the stationary platform 156 (e.g., the end of the stationary platform 156 that the simmer may be seated at). The linear distance PD-C may represent a full reverse linear input force applied to the control yoke 150 by the simmer. The 90 degree to the left orientation of the control yoke 150 may represent a full left roll rotary input applied to the control yoke 150 by the simmer. For example, if the carriage platform 154 has a distance range of 160 mm, the distance PD-C may be the maximum 0 mm position for the carriage platform 154 and the position of the carriage platform 154 may be 80 mm backwards from the center/neutral position. Even at a full backwards position for the carriage platform 154, there may be some linear distance PD-C from the end of the stationary platform 156 (e.g., the carriage platform 154 may not necessarily travel the full range of the stationary platform 156 and/or a stop may be implemented to prevent moving to the very end of the stationary platform 156).

The linear movement LM input and the rotation movement RM input may be determined by the circuit 158. For example, the circuit 158 may read the linear distance PD-C and the rotary position of the control yoke 150 and translate the values to input readable by the computing device 52 and/or the flight simulator software 60 (e.g., roll to the left and pitch upwards). The cockpit visualization 254*c* may respond to the input provided by the apparatus 100. The cockpit visualization 254*c* may generate video output that shows the cockpit yoke with a 90 degree left roll rotational orientation and the shaft pulled outwards from the instrument panel. For example, the length of the shaft shown in the cockpit visualization 254*c* may be longer than the length of the shaft shown in the cockpit visualization 254*a*. The cockpit visualization 254*c* may generally represent the input provided by the control yoke 150 and/or the carriage platform 154 at the linear distance PD-C.

The example controller inputs 252*a*-252*c* may represent input to the apparatus 100 at the neutral position and/or the extreme positions (e.g., center, fully forward, fully backward, fully rotated right and fully rotated left). However, the input to the apparatus 100 may be any position in between the extreme positions. For example, the control yoke 150 may be rotated at any angle from the 90 degree to the left to the 90 degree angle to the right and the carriage platform 154 may be located at any distance along the rails 172*a*-172*b*. In some embodiments, the range of the rotation movement RM may be less than 90 degrees. In some embodiments, the range of the linear movement LM may be less than the length of the rails 172*a*-172*b*.

Figure 6:
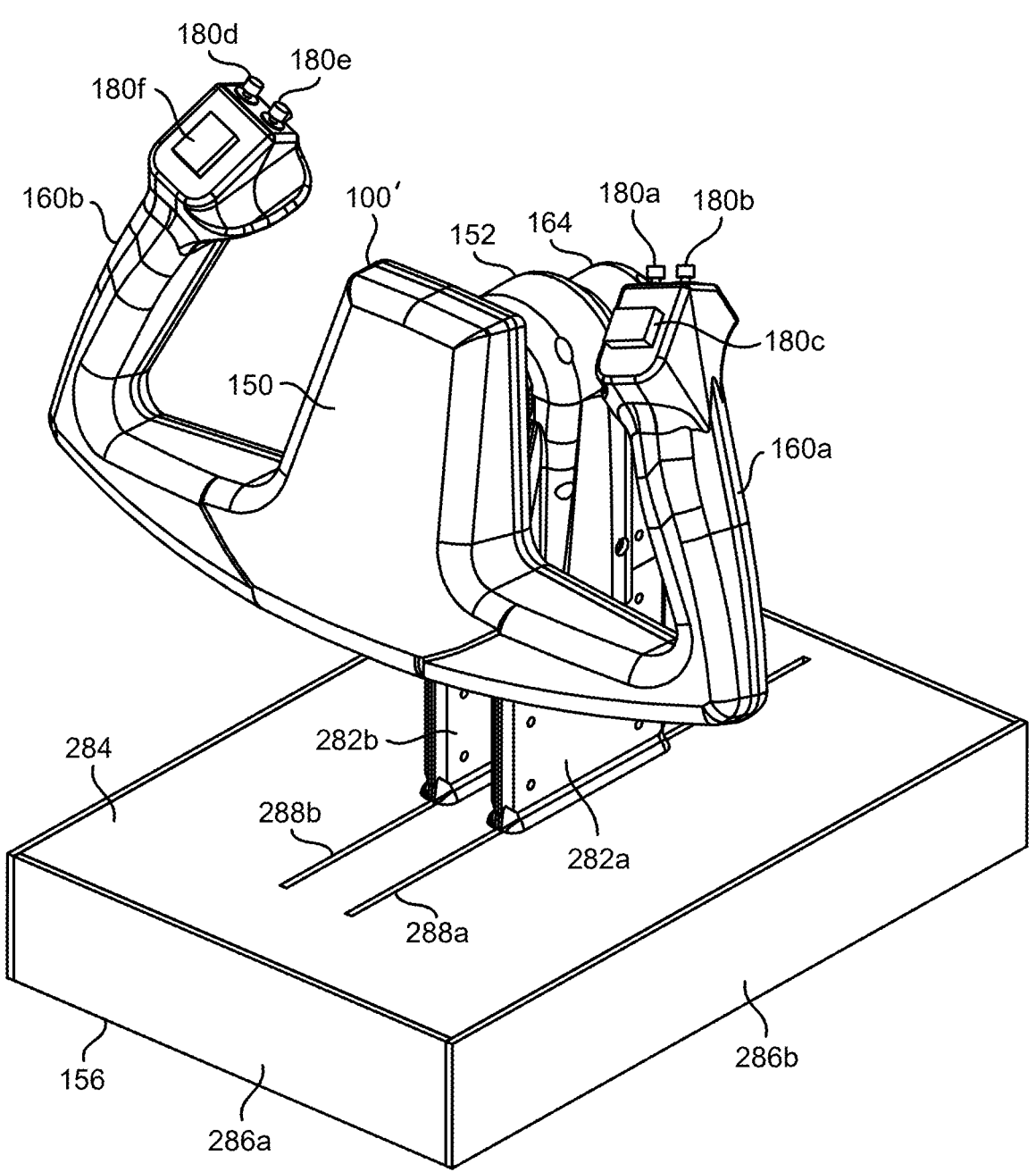
FIG. 6 is a diagram illustrating an example embodiment of the present invention with a cover.

Referring to FIG. 6, a diagram illustrating an example embodiment of the present invention with a cover is shown. A perspective view 280 is shown. The perspective view 280 may provide an isometric view of the front of the apparatus 100'. The apparatus 100' may comprise an alternate embodiment with a dual-fin controller.

The dual-fin controller 100' may comprise the control yoke 150, the carriage pillar 152 and the stationary platform 156. In the perspective view 280, the carriage platform 154 may be hidden from view. The control yoke 150 may comprise the grips 160*a*-160*b* and/or the buttons 180*a*-180*n*. In the perspective view 280, the yoke shaft 162 may be hidden from view. The yoke shaft 162 may enable the rotation motion RM of the control yoke 150. The carriage pillar 152 may comprise the carriage receptacle 164. In the perspective view 280, the pillar base 166 may be hidden from view.

The dual-fin controller 100' may comprise two fins (e.g., dual-fins) 282*a*-282*b* for the carriage pillar 152. For example, the carriage pillar 152 may have one portion at a top end (e.g., with the carriage receptacle 164), and then may split off into the dual-fin pillar 282*a*-282*b*. The dual-fin pillar 282*a*-282*b* may enable the carriage pillar 152 and the carriage platform 154 to be compatible with a two rail implementation (e.g., the movement mechanism with the rail risers 170*a*-170*d* and the rails 172*a*-172*b*) for the stationary platform 156. The dual-fin pillar 282*a*-282*b* may provide stability for the control yoke 150. The dual-fin pillar 282*a*-282*b* may enable the stationary platform 156 to implement the stationary rack 204 near a center of the stationary platform 156 for measuring linear movement, while still providing the rails 172*a*-172*b* at the outer edges of the stationary platform 156 to guide movement of the carriage platform 154. Similar to the carriage pillar 152 shown in association with FIG. 3, the dual-fin pillar 282*a*-282*b* may extend a length down from the carriage receptacle 164 to the pillar base 166 (not shown in the perspective view 280) and the height of the dual-fin pillar 282*a*-282*b* may be greater than a clearance for the range of rotation of the control yoke 150. In one example, the dual-fin pillar 282*a*-282*b* may be approximately 1.5 inches wide (together) with each of the fins approximately 0.35 inches thick and 3.4 inches long and each of the fins may extend approximately 5.4 inches down from the carriage receptacle 164 to the stationary platform 156. The particular dimensions of the dual-fin pillar 282*a*-282*b* may be varied according to the design criteria of a particular implementation.

The stationary platform 156 may comprise a cover plate 284 and enclosure sides 286*a*-286*d*. The cover plate 284 and the enclosure sides 286*a*-286*d* may enable the stationary platform 156 to provide an enclosure for the carriage platform 154 and/or other components of the dual-fin controller 100'. For example, the cover plate 284 may be implemented at a level above the carriage platform 154 and the carriage platform 154 may slide below the cover plate 284. In the perspective view 280, the enclosure sides 286*a*-286*b* are shown. The cover plate 284 may hide the carriage platform 154 from view and/or provide protection to the components enclosed within the stationary platform 156. In one example, the stationary platform 156 with the cover plate 284 and the enclosure sides 286*a*-286*d* may have a length of approximately 12 inches, a width of approximately 8 inches and a height of approximately 2 inches. The dimensions of the stationary platform 156 may be varied according to the design criteria of a particular implementation.

The cover plate 284 may comprise a number of slots 288a-288b. The slots 288a-288b may implement fin slots. The fin slots 288a-288b may be spaced apart from each other to fit the spacing of the dual-fin pillar 282a-282b of the carriage pillar 152. In one example, the fin slots 288a-288b may be approximately one inch apart and the dual-fin pillar 282a-282b may be approximately one inch apart. The fin slots 288a-288b may enable the dual-fin pillar 282a-282b to pass through the cover plate 284 and/or attach to the carriage platform 154 at the level below the cover plate 284. The fin slots 288a-288b may each have a length to accommodate the linear movement of the carriage platform 154. For example, the dual-fin pillar 282a-282b may slide forward and backward along the fin slots 288a-288b as the simmer provides a force to the control yoke 150 that may move the carriage platform 154. In one example, the length of the fin slots 288a-288b may be approximately 9.5 inches long. The particular size of the fin slots 288a-288b may be varied according to the design criteria of a particular implementation.

Figure 7:
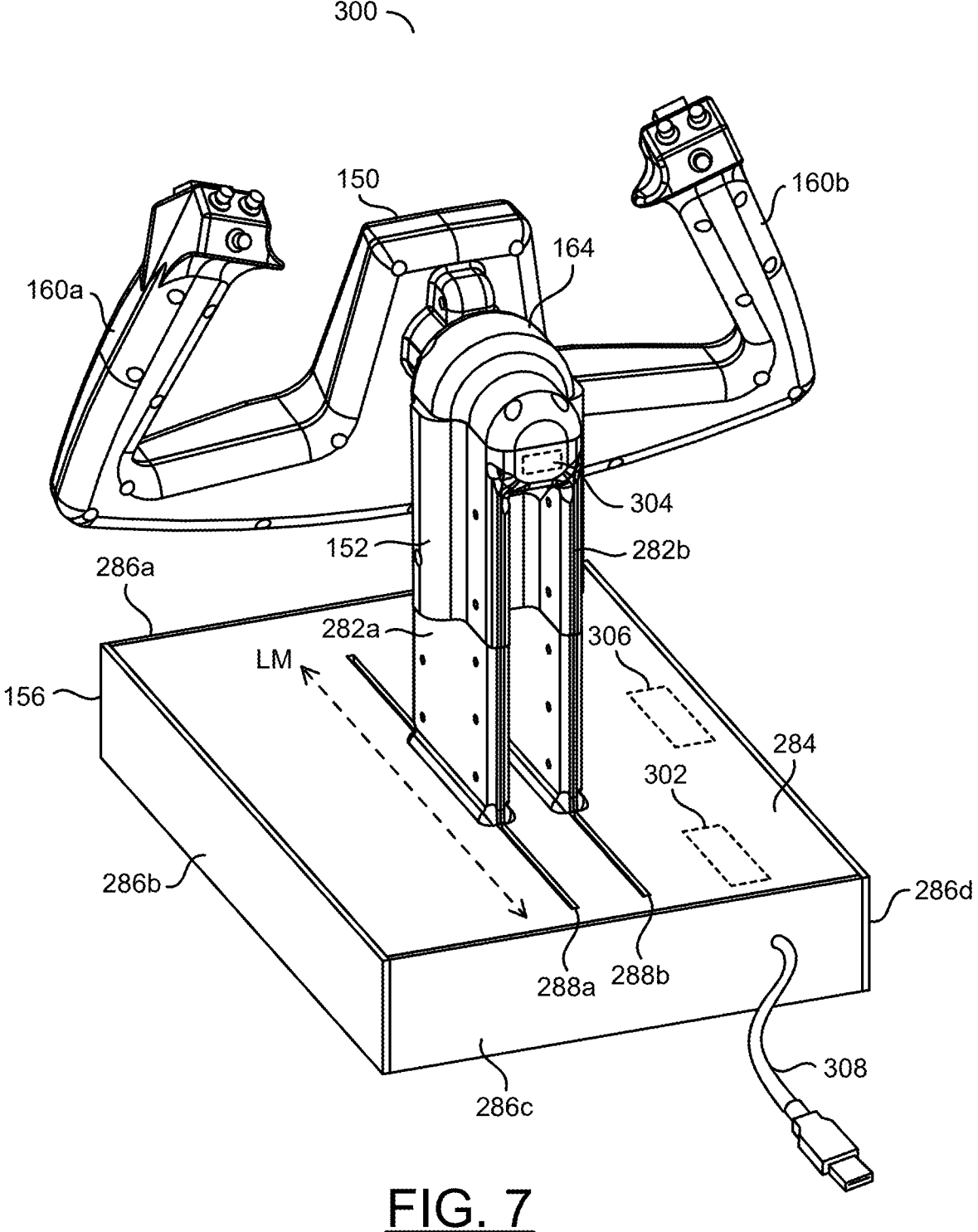
FIG. 7 is a diagram illustrating an alternate view of the example embodiment of the present invention.

Referring to FIG. 7, a diagram illustrating an alternate view of the example embodiment of the present invention is shown. A perspective view 300 is shown. The perspective view 300 may provide an isometric view of the rear of the dual-fin controller 100'. In the rear perspective view 300, the control yoke 150, the carriage pillar 152, and the stationary platform 156 of the dual-fin controller 100' are shown. The grips 160a-160b of the control yoke 150 is shown. The carriage receptacle 164 and the dual-fin pillar 282a-282b of the carriage pillar 152 are shown. The carriage platform 154 may be hidden from view by the cover plate 284 and the enclosure sides 286a-286d of the stationary platform 156. The enclosure sides 286b-286c may be visible in the rear perspective view 300. The fin slots 288a-288b are shown on the cover plate 284.

The linear movement LM is shown along the fin slots 288a-288b. The dual-fin pillar 282a-282b may slide along the respective fin slots 288a-288b as the simmer provides the linear force to the control yoke 150. The dual-fin pillar 282a-282b may slide forwards and backwards to travel the complete length of the fin slots 288a-288b. For example, when the simmer pushes forwards on the control yoke 150, the carriage pillar 152 may transfer the linear force down the carriage pillar 152 and the dual-fin pillar 282a-282b may move along the fin slots 288a-288b (pushing the carriage platform 154 that may be below the cover plate 284) towards the enclosure side 286c. Similarly, when the simmer pulls backwards on the control yoke 150, the carriage pillar 152 may transfer the linear force down the carriage pillar 152 and the dual-fin pillar 282a-282b may move along the fin slots 288a-288b (pulling the carriage platform 154 that may be below the cover plate 284) towards the enclosure side 286a.

The dual-fin controller 100' may comprise a block (or circuit) 302, a block (or circuit) 304 and/or a block (or circuit) 306. The circuit 302 may implement a processor. The circuit 304 may implement a roll encoder. The circuit 306 may implement a pitch sensor. The dual-fin controller 100' may comprise other components and/or circuitry (not shown). The circuits 302-306 are shown at various locations for illustrative purposes. For example, the circuits 302-306 may be components of the circuit 158 shown in association with FIG. 3. In some embodiments, the locations of the circuits 302-306 may be implemented at different locations on the dual-fin controller 100' than shown in the rear perspective view 300. The number, type, functionality and/or location of the components of the dual-fin controller 100' may be varied according to the design criteria of a particular implementation.

The processor 302 may be configured to translate a rotation of the control yoke 150 to a roll input. For example, the processor 302 may be configured to receive data (e.g., a voltage output) that measures the rotation movement RM of the control yoke 150 from the roll encoder 304 and translate the rotation measurement to the roll input. The processor 302 may be configured to translate the linear movement LM of the carriage platform 154 to a pitch input. For example, the processor 302 may be configured to receive data (e.g., a voltage output) that measures the linear movement LM of the carriage platform 154 from the pitch sensor 306 and translate the linear movement measurement to the pitch input.

The processor 302 may be configured to implement an interface and/or communicate according to an application programming interface (API). The interface implemented by the processor 302 may be configured to communicate according to a protocol that may be readable by the computing device 52 and/or the flight simulator software 60. The interface may enable the processor 302 to communicate the pitch input and/or the roll input in a format that may be readable by the computing device 52 and/or the flight simulator software 60. For example, the processor 302 may translate the rotation movement RM measured by the roll encoder 304 into a voltage value that may represent the roll input and translate the linear movement LM measured by the pitch sensor 306 into another voltage value that may represent the pitch input. The voltage value for the roll input may correspond to a physical position of the control yoke 150 (e.g., the amount of the rotation movement RM clockwise or counterclockwise). The voltage value for the pitch input may correspond to a physical position of the carriage platform 154 with respect to the stationary platform 156 (e.g., the linear movement LM).

The processor 302 may be configured to receive other types of input generated by the dual-fin controller 100'. For example, the processor 302 may receive input from the buttons 180a-180n. In the example shown, the processor 302 may be located within the stationary platform 156. In some embodiments, the processor 302 may be located in the control yoke 150 and/or as part of the carriage pillar 152. For example, locating the processor 302 in the control yoke 150 may reduce a number of wires coming from the control yoke 150 (e.g., data from the buttons 180a-180n and/or the roll encoder 304 may be routed within the control yoke 150 instead of through the carriage pillar 152). The particular location of the processor 302 may be varied according to the design criteria of a particular implementation.

The roll encoder 304 may be configured to detect and/or measure the rotation movement RM. The roll encoder 304 may detect the rotation of the control yoke 150. In the example shown, the roll encoder 304 may be located in the carriage receptacle 164 at one end of the yoke shaft 162. In another example, the roll encoder 304 may be located in the control yoke 150 at another end of the yoke shaft 162. The roll encoder 304 may be implemented as a potentiometer, optical encoder, hall effect encoders, etc. The particular type of circuitry used to measure the rotation movement RM and/or the particular location of the roll encoder 304 may be varied according to the design criteria of a particular implementation.

The pitch sensor 306 may be configured to detect and/or measure the linear movement LM. The pitch sensor 306 may detect the movement and/or position of the carriage platform 154 along the rails 172a-172b. In the example shown, the position of the enclosure sides 286a-286d may be a center/neutral position and the pitch sensor 306 may detect an offset in a positive (e.g., forward) or negative (e.g., backward) direction. The pitch sensor 306 may be implemented as a potentiometer, optical encoder, hall effect encoders, etc. The particular type of circuitry used to measure the linear movement LM and/or the particular location of the pitch sensor 306 may be varied according to the design criteria of a particular implementation.

The positions measured by the roll encoder 304 and the pitch sensor 306 may be represented as voltage values. Each combination of the voltage values (e.g., one from the roll encoder 304 and another from the pitch sensor 306) may correspond to a unique physical position and/or orientation of the control yoke 150 and the carriage platform 154. The voltage values may be communicated by the processor 302 to the computing device 52 running the flight simulator software 60 to enable control of the aircraft being simulated. The position information for the control yoke 150 and/or the carriage platform 154 may be repeatedly sent to the flight simulator software 60 such that the control input may be updated in a timely manner to affect the response, control and/or behavior of the simulated aircraft. For example, the processor 302 may be configured to sample the roll input and the pitch input according to a sampling time (or polling rate). In one example, the polling rate may be 125 Hz (every 8 ms). In another example, polling rate may be 250 Hz (every 4 ms). In yet another example, the polling rate may be 500 Hz (every 2 ms). In still another example, the polling rate may be 1000 Hz (every 1 ms). The sampling time may enable the roll input the pitch input to update a movement of the aircraft being simulated by flight simulator software 60. The particular sampling time and/or the particular voltages that correspond to a particular combination of positions may be varied according to the design criteria of a particular implementation.

A cable 308 is shown. The cable 308 may be an interface cable. For example, the interface cable 308 may be the cable 62c shown in association with FIG. 1. The interface cable 308 may be configured to receive the pitch input, the roll input, and/or other data generated by the processor 302. The interface cable 308 may implement a communication and/or interface protocol to enable the output generated by the processor 302 to be presented to the computing device 52. In an example, the interface cable 308 may implement a USB protocol. For example, the interface cable 308 may be a USB-A cable, a USB-C cable, etc. In some embodiments, the processor 302 may implement a Bluetooth protocol to enable the dual-fin controller 100' to communicate wirelessly with the computing device 52. The particular type of interface protocol implemented by the interface cable 308 may be varied according to the design criteria of a particular implementation.

Figure 8:
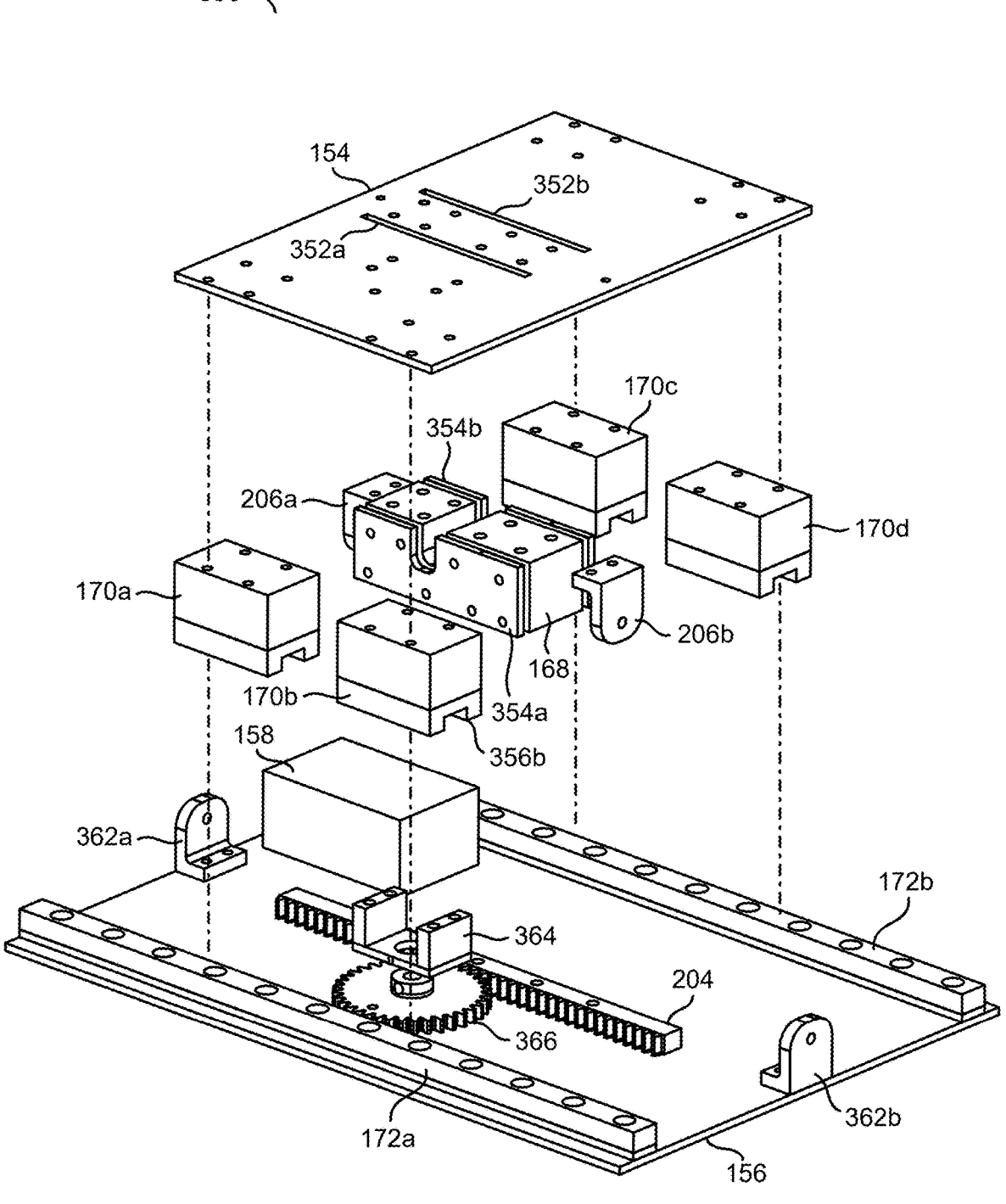
FIG. 8 is a diagram illustrating components of the carriage platform and the stationary platform.

Referring to FIG. 8, a diagram illustrating components of the carriage platform and the stationary platform is shown. An exploded view 350 is shown. The exploded view 350 may comprise a visualization of the various components enclosed in the stationary platform 156 (e.g., within the cover plate 284 and the enclosure sides 286a-286d) of the dual-fin controller 100'. The exploded view 350 may provide an illustrative representation of how the various components fit together. While various components are shown connecting together at particular locations as a representative example, the specific location of each of the components of the dual-fin controller 100' within the stationary platform 156 may be varied according to the design criteria of a particular implementation.

The exploded view 350 may comprise the carriage platform 154 and the stationary platform 156. The stationary platform 156 may be a base of the dual-fin controller 100'. The carriage platform 154 may be implemented at level below the cover plate 284, shown in association with FIGS. 6-7. For example, the cover plate 284 may hide the movement of the carriage platform 154 from view.

The carriage platform 154 may comprise platform slots 352a-352b. The platform slots 352a-352b may be through holes that may provide a path through the carriage platform 154. The location of the platform slots 352a-352b may correspond to the location of the fin slots 288a-288b on the cover plate 284. The platform slots 352a-352b may enable the dual-fin pillar 282a-282b to slide to enable the linear movement LM. The platform slots 352a-352b may enable the dual-fin pillar 282a-282b to pass through the carriage platform 154 to enable a connection to the fastening block 168.

The platform slots 352a-352b may each have a length to accommodate the size and/or shape of the dual-fin pillar 282a-282b. In one example, the platform slots 352a-352b may be approximately 3 inches long and each of the platform slots 352a-352b may be approximately 0.15 inches wide. The platform slots 352a-352b may be shorter than the fin slots 288a-288b. For example, the platform slots 352a-352b may have a length limited to the length of the dual-fin pillar 282a-282b to ensure that the carriage platform 154 moves as the force is applied to control yoke 150. The dual-fin pillar 282a-282b may be tapered and/or have a smaller size below the cover plate 284 than above the cover plate 284. The tapered portion of the dual-fin pillar 282a-282b may be the pillar base 166. The smaller size of the dual-fin pillar 282a-282b below the cover plate 284 may enable the dimensions of the platform slots 352a-352b to be smaller than the fin slots 288a-288b of the cover plate 284. The dual-fin pillar 282a-282b may slide forward and backward along the fin slots 288a-288b as the simmer provides a force to the control yoke 150 that may move the carriage platform 154 and the fin slots 288a-288b may fit into the platform slots 352a-352b. The particular dimensions of the platform slots 352a-352b may be varied according to the design criteria of a particular implementation.

The carriage platform 154 may further comprise the fastening block 168, the rail risers 170a-170d, the brackets 206a-206b, and/or the platform sockets 354a-354b. The fastening block 168, the brackets 206a-206b, the platform sockets 354a-354b and/or the rail risers 170a-170d may attach to an underside of the carriage platform 154. The carriage platform 154 may be smaller than the stationary platform 156. In one example, the carriage platform 154 may be a rectangular shape with a length of approximately 4.5-5 inches, a width of approximately 7.9 inches, and a thickness of approximately 0.15 inches thick. The width of the carriage platform 154 may fit across the width of the stationary platform 156, but the length of the carriage platform 154 may be smaller than the length of the stationary platform 156 to enable the carriage platform 154 to travel according to the linear movement LM. The particular size and/or shape of the carriage platform 154 may be varied according to the design criteria of a particular implementation.

The fastening block 168 may enable a rigid attachment of the dual-fin pillar 282a-282b to the carriage platform 154. The fastening block 168 may be attached to the underside of the carriage platform 154. The fastening block 168 may comprise the platform sockets 354a-354b. The platform sockets 354a-354b may provide slots for the vertical structure (e.g., the dual-fin pillar 282a-282b) to rigidly attach to the fastening block 168. The platform sockets 354a-354b may enable the pillar base 166 to connect to the fastening block 168 of the carriage platform 154. The brackets 206a-206b may enable the tensioner 208 to affect the amount of force for moving the carriage platform 154. The rail risers 170a-170d may enable the carriage platform 154 to move along the stationary platform 156.

The platform sockets 354a-354b may be configured to attach to the pillar base 166 of the carriage pillar 152. For example, each of the fins of the dual-fin pillar 282a-282b may fit into a respective one of the platform sockets 354a-354b. The platform sockets 354a-354b may comprise openings for a fastener to attach from the sides to firmly hold the dual-fin pillar 282a-282b in place. In an example, as the force is applied to the control yoke 150 to push or pull back on the control yoke 150, the carriage pillar 152 may transfer the linear force down the carriage pillar 152 along the dual-fin pillar 282a-282b. The dual-fin pillar 282a-282b may attach to the fastening block 168 at the platform sockets 354a-354b. The force applied to the control yoke 150 may move the fastening block 168, which may be attached to the carriage platform 154 to push/pull the carriage platform 154. The platform sockets 354a-354b may be the same size as the platform slots 352a-352b. The platform sockets 354a-354b may be the same size as the dual-fin pillar 282a-282b to ensure a secure fit. For example, the dual-fin pillar 282a-282b may slide into the platform sockets 354a-354b and may be fastened to the fastening block 168.

The rail risers 170a-170d may provide a space between the carriage platform 154 and the stationary platform 156. The space provided by the rail risers 170a-170d may ensure that the various components (e.g., the fastening block 168, the brackets 206a-206b, the platform sockets 354a-354b, etc.) may have sufficient space below the carriage platform 154 and above the stationary platform 156. The rail risers 170a-170d may each be configured to slide along the rails 172a-172b. The rail risers 170a-170d may enable the rails 172a-172b to guide the movement of the carriage platform 154 for straight and/or smooth movement. In the example shown, four of the platform sockets 354a-354b may be implemented. For example, the four rail risers 170a-170d may provide balance for the carriage platform 154 to ensure that the carriage platform 154 may be a flat surface parallel to the stationary platform 156. In some embodiments, more or fewer of the rail risers 170a-170d may be implemented. In one example, the rail risers 170a-170d may have a height of approximately 1.25 inches and a width of approximately 1 inch. The particular number, and/or size of the rail risers 170a-170d may be varied according to the design criteria of a particular implementation.

The rail risers 170a-170d may be configured to connect to and/or slide along the rails 172a-172b. The rail risers 170a-170d may be configured to prevent vertical removal from the rails 172a-172b. A groove lock 356 is shown on the rail riser 170b. While the groove lock 356b is labeled on the rail riser 170b for illustrative purposes, each of the rail risers 170a-170d may comprise the groove lock 356. The groove lock 356 may comprise a groove on the bottom side of the rail risers 170a-170d that may fit onto the rails 172a-172b. The groove lock 356 may comprise ball bearings on the inner sides of the groove. The ball bearings may reduce friction and/or facilitate the rail risers 170a-170d sliding along the rails 172a-172b. In another example, the rail risers

170a-170d may comprise a slot on the groove channel that may fit together with and slide along the rails 172a-172b. In still another example, the rail risers 170a-170d may comprise thrust washers on the groove channel that may facilitate movement along the rails 172a-172b. In yet another example, the rail risers 170a-170d may comprise a bushing on the groove channel that may facilitate movement along the rails 172a-172b. The groove lock 356 may prevent the rail risers 170a-170d from being vertically removed from the rails 172a-172b. For example, the rail risers 170a-170d and the rails 172a-172b may be provided together (e.g., as a pre-assembled component that may be locked together). For example, the rail risers 170a-170d may each comprise the groove lock 356 that may securely attach to the rails 172a-172b and/or may prevent the removal of the rail risers 170a-170d from the rails 172a-172b (e.g., the rail risers 170a-170d and the rails 172a-172b may be formed together). The size and/or shape of the groove lock 356 may be varied according to the design criteria of a particular implementation.

The stationary platform 156 may comprise the circuit 158, the rails 172a-172b, the stationary rack 204 and/or anchor bases 362a-362b. The rails 172a-172b may be configured to attach to the fastening block 168 and/or the rail risers 170a-170d. The rails 172a-172b may guide the movement and/or provide a track for the movement of the carriage platform 154. For example, the rails 172a-172b may enable the linear movement LM of the carriage platform 154. The circuit 158 may comprise one or more of the processor 302 and/or the pitch sensor 306. For example, the circuit 158 may be the pitch sensor 306 for measuring the pitch input. In some embodiments, the circuit 158 may comprise a power switch.

The rails 172a-172b may comprise the rail portion 172a on one side of the stationary platform 156 and the rail portion 172b on the opposite side of the stationary platform 156. For example, the rails 172a-172b may be across from each other along the enclosure side 286b and the enclosure side 286d. In some embodiments, the fastening block 168 may comprise the platform sockets 354a-354b that may be configured to attach to the rails 172a-172b. In some embodiments, the rail risers 170a-170d may slide along the rails 172a-172b together with the fastening block 168. In one example, the rails 172a-172b may each be 11.8 inches long, 0.4 inches tall and 0.5 inches wide. The groove lock 356 may be sized to fit across the width of the rails 172a-172b. The particular size of the rails 172a-172b may be varied according to the design criteria of a particular implementation.

The anchor bases 362a-362b may be located at each end of the carriage platform 154 (e.g., at the enclosure side 286a and the enclosure side 286c). The anchor bases 362a-362b may provide an anchor base for the tensioner 208. For example, one end of the tensioner 208 may be secured to the anchor base 362a and the other end of the tensioner 208 may be secured to the anchor base 362b. The tensioner 208 may be fed from the anchor bases 362a-362b to the brackets 206a-206b to provide resistance for the movement of the carriage platform 154.

A support bracket 364 and a circular gear (e.g., a pinion) 366 are shown. The support bracket 364 and the pinion 366 are shown together at a level of the stationary rack 204. However, the support bracket 364 and the pinion 366 may be attached to the underside of the carriage platform 154. The support bracket 364 may be a support structure configured to fasten the pitch sensor 306 to the carriage platform 154 at a location that may measure the movement of the pinion 366.

The stationary rack 204 may be a linear gear secured to the stationary platform 156. The pinion 366 may be configured to fit together with the stationary rack 204 to form a rack and pinion movement measurement mechanism. As the carriage platform 154 moves along the rails 172a-172b, the pinion 366 may travel along the length of the stationary rack 204. As the pinion 366 travels along the stationary rack 204, the pinion 366 may rotate (e.g., the gear teeth of the stationary rack 204 may mesh with the gear teeth of the pinion 366). The pitch sensor 306 may measure the rotation of the pinion 366 of the rack and pinion arrangement as the carriage platform 154 moves forward and backward. In one example, the stationary rack 204 may be approximately 7.5 inches long, 0.7 inches tall and 0.5 inches wide. The particular size of the stationary rack 204 may be varied according to the design criteria of a particular implementation.

The pitch sensor 306 may measure the linear movement LM of the carriage platform 154 via the movement of the pinion 366. For example, the pitch sensor 306 may be a rotary encoder connected to the pinion 366. The pinion 366, connected to the carriage platform 154, may mesh with the stationary rack 204 connected to the stationary platform 156. The rotation of the pinion 366 may be measured as a voltage value by the pitch sensor 306 and/or presented to the processor 302. The pitch may be sensed by the rack and pinion arrangement of the pinion 366 and the stationary rack 204, where the pinion 366 may rotate a shaft of the pitch sensor 306 as the carriage platform 154 slides forwards and backwards. The voltage output of the pitch sensor 306 may define the physical front/back (fore/aft) position of the carriage assembly (e.g., the combination of the control yoke 150, the carriage pillar 152 and the carriage platform 154). In an example, the pitch sensor 306 may be a hall effect sensor that may be used to detect the center position for pitch. Additional sensors may be used to detect the mechanical extremes of each position (e.g., for a force feedback implementation).

Figure 9:
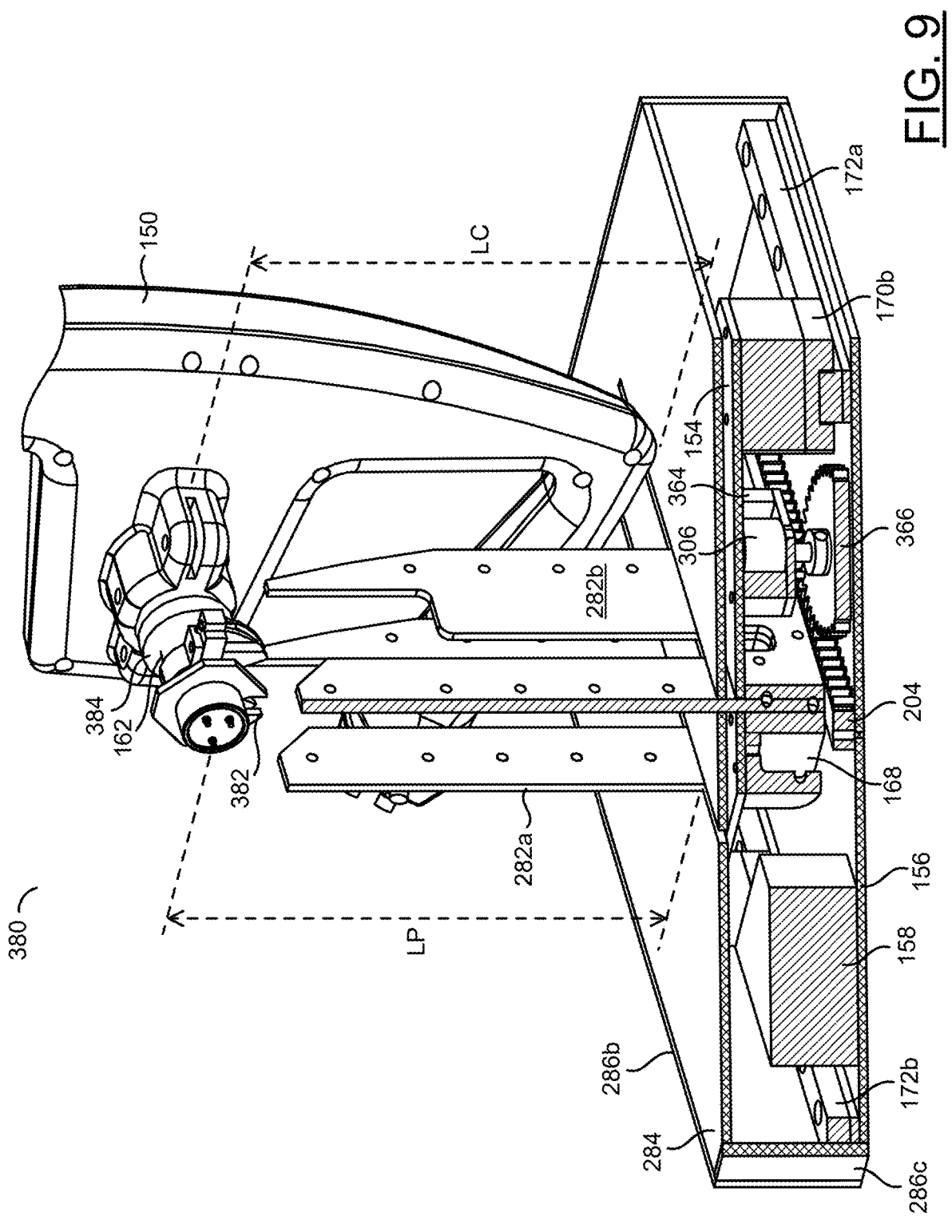
FIG. 9 is a diagram illustrating a cutaway view of the stationary platform and the carriage pillar.

Referring to FIG. 9, a diagram illustrating a cutaway view of the stationary platform and the carriage pillar is shown. A cutaway view 380 of the apparatus 100 is shown.

The cutaway view 380 may comprise a portion of the control yoke 150, a portion of the carriage pillar 152, a portion of the carriage platform 154 and/or a portion of the stationary platform 156. The control yoke 150 is shown rotated approximately 90 degrees to the right (e.g., clockwise). The yoke shaft 162 is shown extending from the control yoke 150. In the example shown, the carriage receptacle 164 has been removed, for illustrative purposes. The portion of the carriage pillar 152 shown may comprise the dual-fin pillar 282a-282b.

The carriage platform 154 is shown below the cover plate 284 of the stationary platform 156. The fastening block 168 is shown attached to an underside of the carriage platform 154. The dual-fin pillar 282a-282b is shown inserted into the fastening block 168 to provide the attachment between the carriage pillar 152 and the carriage platform 154. The rail riser 170b is shown attached to the underside of the carriage platform 154. The rail riser 170b is shown connected to the portion of the rail 172a. The groove lock 356 of the rail riser 170b is shown around the rail 172a. The support bracket 364 is shown attached to the underside of the carriage platform 154. The pitch sensor 306 may be held within the support bracket 364. The pinion 366 may be connected to the support bracket 364. The pinion 366 may be interlocked and/or meshed with the stationary rack 204.

The stationary platform 156 is shown with the enclosure side 286c and the enclosure side 286d partially cut away. A portion of the circuit 158, a portion of the rails 172a-172b and a portion of the stationary rack 204 are shown in the cutaway view 380. The rail risers 170a-170d may be attached to the rails 172a-172b. The rails 172a-172b may guide the movement of the carriage platform 154 via the rail risers 170a-170d. The gear teeth of the stationary rack 204 may be interlocked with the gear teeth of the pinion 366 to enable the pitch sensor 306 to measure the fore/aft movement of the control yoke 150 as the carriage platform 154 moves along the rails 172a-172b. In some embodiments, the circuit 158 may comprise circuitry configured to control force feedback operations. For example, the circuit 158 may be implemented near the force feedback mechanism described in association with FIG. 4. The location of the circuit 158 may be varied according to the design criteria of a particular implementation.

In some embodiments, the rails 172a-172b may be implemented on an underside of the cover plate 284. For example, the rails 172a-172b may be located above the carriage platform 154 and the rail risers 170a-170d may be located an upper surface of the carriage platform 154. In an example, implementing the rails 172a-172b on the underside of the cover plate 284 may enable a shorter height of the stationary platform 156.

The control yoke 150 may comprise the yoke shaft 162. The yoke shaft 162 may be partially within the control yoke 150 and partially within the carriage receptacle 164 (not shown). The yoke shaft 162 may extend from the control yoke 150 to the carriage pillar 152. In one example, the yoke shaft 162 may have a diameter of approximately 30 mm. The particular length and/or diameter of the yoke shaft 162 may be varied according to the design criteria of a particular implementation.

The yoke shaft 162 may comprise a bungee channel 382 and/or a bearing 384. The yoke shaft 162 may be hollow. The bungee channel 382 may provide a downward path from a hollow channel of the yoke shaft 162. The interior of the yoke shaft 162 may provide a cavity for routing various wires. For example, depending on the location of the circuit 158, wiring from the buttons 180a-180n, the processor 302, the roll encoder 304 and/or the roll encoder 304 may pass through the bungee channel 382 of the yoke shaft 162. The bungee channel 382 may enable a path down to/from the carriage pillar 152. The bearing 384 be configured to aid and/or guide in the rotation of the yoke shaft 162 to enable the control yoke 150 to rotate (e.g., for the roll input).

The control yoke 150 is shown rotated approximately 90 degrees to the right. A length (e.g., LC) is shown. The length LC may be a distance from a center of the control yoke 150 (e.g., at a location of the yoke shaft 162) to one of the grips 160a-160b (e.g., the left grip 160b, in the example shown). Generally, a width (e.g., a distance between the grips 160a-160b) may be greater than a height of the control yoke 150. The length LC may be an amount of clearance to ensure the free rotation of the control yoke 150. In one example, the distance LC may be approximately 9.5 inches to 10 inches. The particular size of the control yoke 150 may be varied according to the design criteria of a particular implementation.

A distance (e.g., LP) is shown. The distance LP may represent a height of the carriage pillar 152. The distance LP may be from the carriage receptacle 164 to the cover plate 284 (or the carriage platform 154 if the cover plate 284 is not implemented). In the example shown, the distance LP may be measured from the yoke shaft 162, representing a center point of the carriage receptacle 164 of the carriage pillar 152. The dual-fin pillar 282a-282b may be sized having a height that may enable the distance LP for the carriage pillar 152. In the example shown, the dual-fin pillar 282a-282b may extend below the cover plate 284 and into the platform sockets 354a-354b of the fastening block 168. In some embodiments, the dual-fin pillar 282a-282b may be longer than the distance LP to accommodate the additional length for attaching to the platform sockets 354a-354b under the cover plate 284. In one example, the distance LP may be approximately 12.75 inches. The particular length of the dual-fin pillar 282a-282b and/or the carriage pillar 152 may be varied according to the design criteria of a particular implementation.

In some embodiments, the distance LP may be longer than the distance LC. The height of the carriage pillar 152 (e.g., the distance LP) may be sufficient to ensure clearance for the rotation of the control yoke 150. The amount of distance of the distance LP that is greater than the distance LC may be an amount of clearance between the control yoke 150 and the cover plate 284 (or the carriage platform 154 if the cover plate 284 is not implemented). In some embodiments, the distance LP may be similar to or less than the distance LC. For example, the rotation movement RM for the control yoke 150 may not enable a full rotation (e.g., a full 90 degree rotation in either direction). In an example, the rotation movement RM may be limited to approximately 75 degrees of rotation in either direction (e.g., which may not need as much clearance for the control yoke 150 as a rotation range of 90 degrees in either direction). Generally, the distance LC may provide a sufficient height to provide clearance for the range of rotation of the control yoke 150 (e.g., enable clearance for the entire usable rotation of the control yoke 150). For example, with a maximum rotation of 75 degrees of rotation, the height LC may provide clearance to prevent the grips 160a-160b from contacting the stationary platform 156 at any rotation amount for the control yoke 150. The amount of clearance for the rotation of the control yoke 150 may be varied according to the design criteria of a particular implementation.

Figure 10:
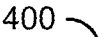
FIG. 10 is a diagram illustrating a cutaway view of the control yoke and the carriage pillar.

Referring to FIG. 10, a diagram illustrating a cutaway view of the control yoke and the carriage pillar is shown. A control yoke cutaway view 400 is shown. The control yoke cutaway view 400 may comprise a portion of the control yoke 150 and a portion of the carriage pillar 152. The portion of the control yoke 150 may provide a cutaway view of some internal components of the control yoke 150. The portion of the carriage pillar 152 may provide a cutaway view of some internal components of the carriage pillar 152 implemented in the carriage receptacle 164. The control yoke cutaway view 400 may comprise one example embodiment of the apparatus 100. The particular arrangement of components within the apparatus 100 may be varied according to the design criteria of a particular implementation.

In the example shown, the control yoke 150 may comprise the processor 302 and the roll encoder 304. For example, the processor 302 and the roll encoder 304 may be implemented within the control yoke 150 and the pitch sensor 306 may be implemented elsewhere in the apparatus 100 (e.g., in the stationary platform 156). The control yoke 150 may comprise a yoke cavity 402, a yoke shaft channel 404, a mounting plate 406 and/or an access path 408.

The yoke cavity 402 may provide a hollow space within the control yoke 150. The yoke shaft 162 may be partially within the yoke cavity 402 (e.g., one end of the yoke shaft 162 may be within the yoke cavity 402). In the example shown, the processor 302, the roll encoder 304, and the mounting plate 406 may be implemented within the yoke cavity 402. The mounting plate 406 may be secured in the yoke cavity 402 to provide a stable and/or secure surface to attach the roll encoder 304. The mounting plate 406 may be located generally central to the control yoke 150 to enable an alignment of the roll encoder 304 and the yoke shaft 162. Aligning the roll encoder 304 with the location of the yoke shaft 162 may enable the roll encoder 304 to measure the rotation of the yoke shaft 162.

The processor 302 may be located within the yoke cavity 402. In the example shown, the processor 302 may be located at a level below the yoke shaft 162. The processor 302 may comprise an electrical connector (or interface) 410 and/or a button 412. The processor 302 may comprise other components (not shown). In one example, the electrical connector 410 may implement a USB connector (e.g., a pico USB connector). In one example, the button 412 may implement a boot select button. The boot select button 412 may be aligned with the access path 408. Aligning the access path 408 with the boot select button 412 may enable a user to press the boot select button 412. For example, the access path 408 may be a narrow path (e.g., smaller than a diameter of a finger) that may enable access to a small prodding device (e.g., a needle, a SIM card ejector, a CD-ROM ejector, etc.) for pressing the boot select button 412. The boot select button 412 may enable reprogramming and/or updating a firmware of the processor 302.

Wires 414a-414b are shown in the yoke cavity 402. The wires 414a-414b may electronically and physically connect to the USB connector 410 of the processor 302. The wires 414a-414b may be passed through the yoke shaft channel 404 of the yoke shaft 162 and channeled down through the carriage pillar 152 via the bungee channel 382. One or more of the wires 414a-414b may be configured to transmit data signals (e.g., a USB signal) to/from the interface cable 308. One or more of the wires 414a-414b may be configured to transmit the pitch position information measured by the pitch sensor 306. For example, one or more of the wires 414a-414b may be connected to the USB connector 410, routed through the yoke shaft channel 404, through the bungee channel 382 down the carriage pillar 152 and may connect to the pitch sensor 306 in the stationary platform 156. While two of the wires 414a-414b are shown, other wires and/or cabling may be connected to the USB connector 410. For example, the buttons 180a-180n may have one or more cables, wires and/or traces connected, which may provide data to the processor 302. In one example, a small circuit board may be implemented in each of the grips 160a-160b that may detect input from the buttons 180a-180n and the circuit boards may each provide a wire that may be routed through the grips 160a-160b to the yoke cavity 402 to provide a connection to the processor 302. In another example, motors within the control yoke 150 may have one or more cables, wires and/or traces connected, which may be controlled by the processor 302. For example, the processor 302 may be connected to motors in the grips 160a-160b that may provide a rumble effect for force feedback. The number, gauge and/or data transmitted by each of the wires 414a-414b may be varied according to the design criteria of a particular implementation.

An encoder shaft 416 is shown. The encoder shaft 416 may be connected to the mounting plate 406 and/or the yoke shaft 162. The encoder shaft 416 may enable the roll encoder 304 to measure the rotation of the yoke shaft 162. For example, the mounting plate 406 (e.g., a mounting base for the roll encoder 304) may be firmly connected to the control yoke 150 and may rotate with the control yoke 150 while the encoder shaft 416 may be held stationary inside the yoke shaft channel 404. For example, the encoder shaft 416 may be a stationary shaft located within the yoke shaft channel 404 of the yoke shaft 162. The encoder shaft 416 may be anchored to the carriage receptacle 164. The yoke shaft 162 may comprise a rotating outer shaft with the yoke shaft channel 404 and the encoder shaft 416 may be a stationary inner shaft of the yoke shaft 162. In an example, the encoder shaft 416 may be approximately 12.5 mm in diameter. The encoder shaft 416 may be held stationary inside the yoke shaft channel 404 by an anchor point in the carriage receptacle 164, which may prevent movement of the encoder shaft 416.

The bungee channel 382 and the bearing 384 are shown within the carriage receptacle 164. For example, the yoke shaft 162 and the wires 414a-414b and/or the encoder shaft 416 may be within the yoke shaft channel 404. The bungee channel 382 may provide a path downward from the yoke shaft channel 404 to the carriage pillar 152 (e.g., along the dual-fin pillar 282a-282b. The bearing 384 may facilitate the rotation of the yoke shaft 162. The wires 414a-414b are shown extending down the carriage pillar 152 from the bungee channel 382.

In some embodiments, the carriage receptacle 164 may comprise the roll encoder 304. A dotted shape for an alternate location 304' is shown. In the example shown, the roll encoder 304 may be located in the yoke cavity 402 and the alternate location 304' may be an anchor point in the carriage receptacle 164 for the encoder shaft 416. In embodiments with the roll encoder 304 implemented in the yoke cavity 402, the roll encoder 304 may rotate with the control yoke 150, while the encoder shaft 416 may be affixed to the carriage receptacle 164 (e.g., at the alternate location 304') and stationary. In another example, the roll encoder 304 may be located at the alternate location 304' and affixed (and stationary) to the carriage receptacle 164, while the encoder shaft 416 may be connected to a center of the yoke shaft 162 and may rotate. The location of the roll encoder 304 may be varied according to the design criteria of a particular implementation.

Implementing the apparatus 100 with the circuit 158 partitioned between the control yoke 150 and the stationary platform 156 (e.g., with the processor 302 and the roll encoder 304 in the control yoke 150 and the pitch sensor 306 within the stationary platform 156) may limit the amount of wiring between the control yoke 150 and the stationary platform 156. For example, the buttons 180a-180n of the control yoke 150 may comprise at least six pushbuttons and a number or more on/off switches (e.g., rocker switches). Implementing the processor 302 in the stationary platform 156 may result in more wiring being routed down the carriage pillar 152. For example, with the processor 302 and the roll encoder 304 in the yoke cavity 402 of the control yoke 150, the amount of wiring routed down the carriage pillar 152 may be limited to two of the wires 414a-414b (e.g., USB data to the interface cable 308 and pitch input from the pitch sensor 306).

In the example shown, the roll input may be sensed and/or measured by the roll encoder 304 and/or a potentiometer connected to the yoke shaft 162. The position (e.g., the rotation movement RM) of the control yoke 150 may be sensed based on a voltage output from the roll encoder 304. In some embodiments, an optical encoder may provide a position value and/or varying voltage values based on the rotated position of the yoke shaft 162. In some embodiments the circuit 158 may implement an IMU. For example, an IMU may be implemented comprising accelerometers and a 3-axis gyroscope (e.g., used instead of the roll encoder 304 and/or the pitch sensor 306). In an example, the IMU may be mounted to a center of the yoke shaft 162 and/or the control yoke 150. Roll and pitch may be provided electronically from the IMU to the processor 302 and then communicated to the flight simulator software 60 (either via the interface cable 308 and/or wirelessly). In one example, an IMU 9DOF (LCM20600+AK09918) may be implemented that may implement a 9 degrees of freedom IMU, combining gyroscope, accelerometer and electronic compass. The gyroscope may measure orientation and angular velocity, the accelerometer may measure acceleration and the electronic compass may measure magnetic force, which may provide direction information. For example, implementing an IMU may enable the pitch input and/or the roll input to be generated without implementing the roll encoder 304, the pitch sensor 306 and the associated components (e.g., the stationary rack 204 and the pinion 366). An IMU may result in data drift. A hall effect sensor may force the coordinates to an origin/center position, which may be used to limit an amount of drift. For example, the IMU may be implemented with the processor 302 in the yoke cavity 402. The particular combination of sensors that implement the circuit 158 may be varied according to the design criteria of a particular implementation.

Figure 11:
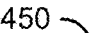
FIG. 11 is a diagram illustrating an example embodiment of the present invention implementing a single-fin carriage pillar.

Referring to FIG. 11, a diagram illustrating an example embodiment of the present invention implementing a single-fin carriage pillar is shown. A perspective view 450 of the apparatus 100" is shown. The apparatus 100" may comprise an alternate embodiment of the apparatus 100 that implements a single-fin controller. The perspective view 450 may provide an isometric view of the front of the single-fin controller 100".

The single-fin controller 100" may comprise the control yoke 150, the carriage pillar 152 and the stationary platform 156. In the perspective view 450, the carriage platform 154 may be exposed. For example, the single-fin controller 100" may be implemented with the cover plate 284 and the enclosure sides 286a-286d (e.g., similar to the dual-fin controller 100' shown in association with FIG. 6), but the cover plate 284 and the enclosure sides 286a-286d are not shown for illustrative purposes. For example, without showing the cover plate 284 and/or the enclosure sides 286a-286d, internal components of the stationary platform 156 of the single-fin controller 100" may be visible. The control yoke 150 may comprise the grips 160a-160b and/or the buttons 180a-180n. In the perspective view 450, the yoke shaft 162 may be hidden from view. The rails 172a-172b and the stationary rack 204 are shown on the stationary platform 156. The rail risers 170a-170d are shown connected to the rails 172a-172b. The pinion 366 is shown interlocked with the stationary rack 204. The support bracket 364 is shown connected to the pinion 366 to enable the pitch sensor 306 to read the linear movement LM.

The single-fin controller 100" may comprise a single fin pillar 282' for the carriage pillar 152 and a single platform slot 352' for the stationary platform 156'. For example, the carriage pillar 152 may have one portion at a top end (e.g., with the carriage receptacle 164), and then may extend down towards the carriage platform 154' as the single fin pillar 282'. The single platform slot 352' may be a single hole/slot that may provide a path through the carriage platform 154'. The location of the single platform slot 352' may correspond to the location of a single fin slot on the cover plate 284 (e.g., the cover plate 284 for the single-fin controller 100" may similarly implement a single slot in the middle).

The single platform slot 352' may enable the single fin pillar 282' to slide to enable the linear movement LM. The single platform slot 352' may enable the single fin pillar 282' to pass through the carriage platform 154' to enable a connection to the fastening block 168'. The single platform slot 352' may have a length and width to accommodate the size and/or shape of the single fin pillar 282'. The single platform slot 352' may be shorter than the fin slot on the cover plate 284. For example, the single platform slot 352' may have a length limited to the length of the single fin pillar 282' to ensure that the carriage platform 154' moves as the force is applied to control yoke 150. For example, the single fin pillar 282' may slide forward and backward along the fin slot of the cover plate 284 as the simmer provides a force to the control yoke 150 that may move the carriage platform 154'.

The carriage platform 154' may comprise the single-fin fastening block 168' attached to the underside of the carriage platform 154'. The single-fin fastening block 168' may be configured to secure the single fin pillar 282' to the carriage platform 154'. The single-fin fastening block 168' may comprise a single platform socket 354'. The single platform socket 354' may enable a rigid attachment of the single fin pillar 282' to the carriage platform 154'. The single platform socket 354' may provide a single slot for the vertical structure (e.g., the single fin pillar 282') to rigidly attach to the single-fin fastening block 168'. The single platform socket 354' may be configured to attach to the pillar base 166 of the carriage pillar 152. For example, single fin pillar 282' may fit into single platform socket 354'. The single platform socket 354' may comprise an opening for a fastener to attach from the sides to firmly hold the single fin pillar 282' in place. The single platform socket 354' may be the same size as the single platform slot 352'. The single platform slot 352' may be the same size as the single fin pillar 282' to ensure a secure fit. For example, the single fin pillar 282' may slide into the single platform socket 354' and may be fastened to the single-fin fastening block 168'. The single-fin fastening block 168' may be secured to the carriage platform 154'.

In the example shown, the single-fin fastening block 168' is shown attached to an underside of the carriage platform 154' implemented with the single platform socket 354'. In some embodiments, the fastening block 168 (or the single-fin fastening block 168') may be implemented on an underside of the carriage platform 154. In some embodiments, the fastening block 168 (or the single-fin fastening block 168') may be implemented on a top side of the carriage platform 154. In some embodiments, the fastening block 168 (or the single-fin fastening block 168') may be implemented partially on the topside and partially on the underside of the carriage platform 154 (e.g., sandwiching the carriage platform 154). In some embodiments, the fastening block 168 (or the single-fin fastening block 168') may be implemented as an extrusion (e.g., a metal extrusion). In an example, the single fin pillar 282' (or the dual-fin pillar 282a-282b) may be implemented by one piece of a 2020 aluminum extrusion, and the single-fin fastening block 168' (or the fastening block 168) may be implemented by a second piece of a 2020 aluminum extrusion, which both may be connected at a right angle using an angle bracket and fasteners (e.g., a T-nut that may slide in grooves of the aluminum extrusions and may be compression clammed with screws). The T-nut fasteners may further enable the extrusion forming the single-fin fastening block 168' (or the fastening block 168) to attach to the carriage platform 154. In one example, the extrusion may be a 2020 aluminum extrusion. In another example, the extrusion may be a 1010 extrusion, a 1515 extrusion, a 2040 extrusion, etc. Other types of extrusion may be implemented (e.g., various metric and/or Imperial/US Standard measurements). The particular implementation of the single-fin fastening block 168' and/or the single fin pillar 282' may be varied according to the design criteria of a particular implementation.

In an example, as the force is applied to the control yoke 150 to push or pull back on the control yoke 150, the carriage pillar 152 may transfer the linear force down the carriage pillar 152 along the single fin pillar 282'. The single fin pillar 282' may attach to the single-fin fastening block 168' at the single platform socket 354'. The force applied to the control yoke 150 may move the single-fin fastening block 168' along with the carriage platform 154'. The single-fin fastening block 168', which may be attached to the carriage platform 154' may enable the simmer to push/pull the carriage platform 154'.

The single fin pillar 282' may be implemented at a center of the carriage platform 154'. The single fin pillar 282' may be implemented with a robust material to enable the carriage pillar 152 to provide stability for the control yoke 150. Similar to the dual-fin pillar 282a-282b shown in association with FIG. 9, the single fin pillar 282' may extend the length LP down from the carriage receptacle 164. The single fin pillar 282' may be the pillar base 166 of the single-fin controller 100''. The height of the single fin pillar 282' may be greater than a clearance for the rotation of the control yoke 150 (e.g., the length LP of the single fin pillar 282' may be greater than the length LC of the rotated control yoke 150). Generally, the dual-fin controller 100' implementing the dual-fin pillar 282a-282b may provide a more rigid and/or robust structure for the control yoke 150 than the single fin pillar 282'. In one example, the single fin pillar 282' may be implemented using ⅛" or thicker of an aluminum composite material, which may provide sufficient structure to prevent flimsiness and/or movement of the carriage pillar 152. In some embodiments, the single fin pillar 282' may enable a single rail to be implemented instead of the pair of rails 172a-172b. In some embodiments, with a sufficiently rigid material for the single fin pillar 282', a tube and/or pipe may be implemented instead of a linear rail. The particular type of material used for the single fin pillar 282' and/or the type of movement mechanism used (e.g., a rail, a linear motion tube, a pipe, etc.) with the single fin pillar 282' may be varied according to the design criteria of a particular implementation.

Grooves 452 are shown on the rails 172a-172b. The grooves 452 may provide a recess and/or a channel along the length of the sides of the rails 172a-172b. The grooves 452 may enable the rail risers 170a-170d to lock together with the rails 172a-172b. The grooves 452 may interlock with the groove lock 356 of the rail risers 170a-170d. Locking the rail risers 170a-170d to the rails 172a-172b with the grooves 452 may prevent the rail risers 170a-170d from detaching from the rails 172a-172b. The size of the grooves 452 may be varied according to the design criteria of a particular implementation.

Figure 12:
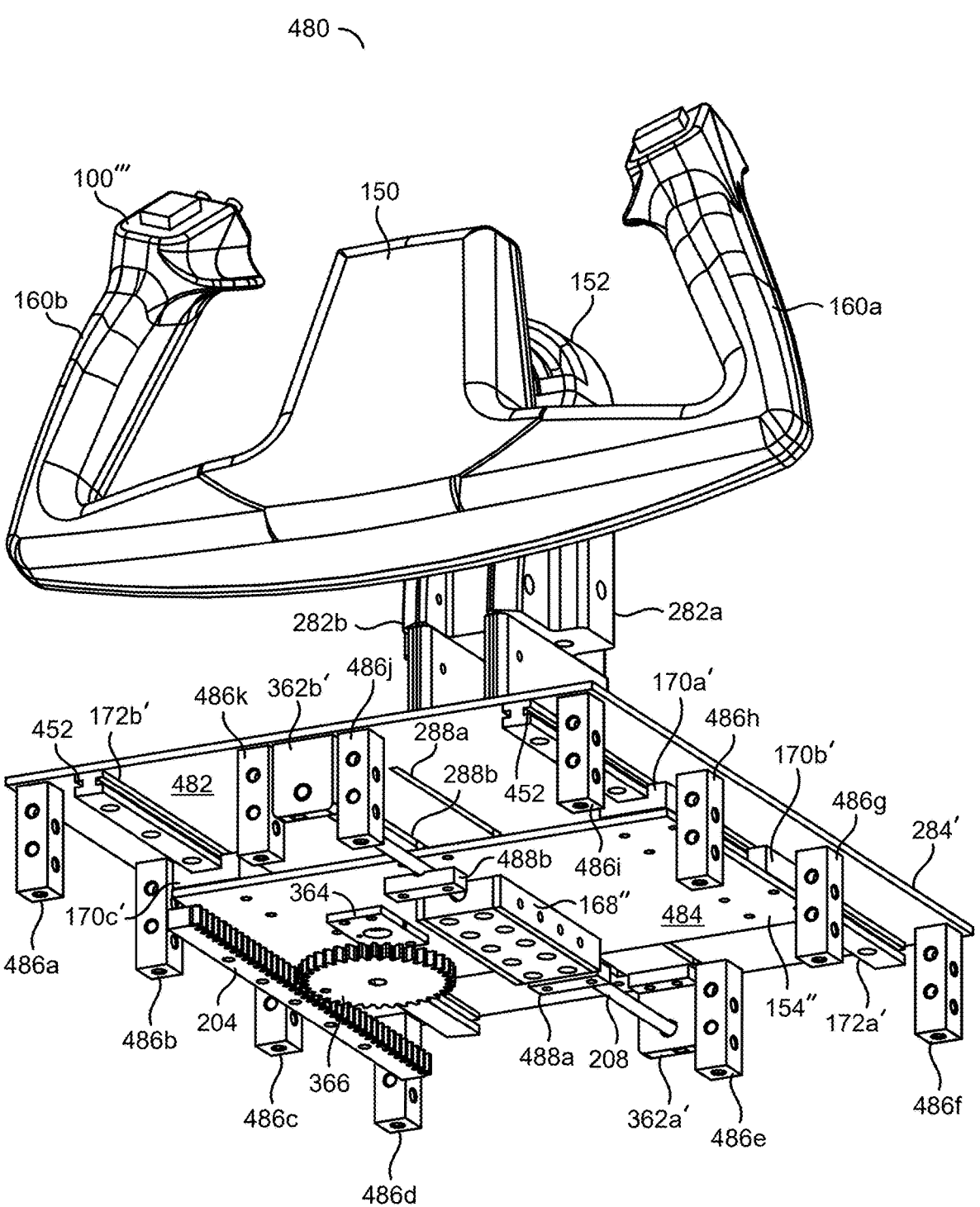
FIG. 12 is a diagram illustrating an example embodiment of the present invention with an inverted rail.

Referring to FIG. 12, a diagram illustrating an example embodiment of the present invention with an inverted rail is shown. An underside view 480 is shown. The underside view 480 may provide a perspective view of the apparatus 100''. The apparatus 100'' may comprise an inverted rail dual-fin controller. The underside view 480 may provide an isometric view of the front and from below the inverted rail dual-fin controller 100''.

The inverted rail dual-fin controller 100'' may comprise the control yoke 150 and the carriage pillar 152 similar to the dual-fin controller 100' shown in association with FIG. 6. For example, the inverted rail dual-fin controller 100" may comprise the control yoke 150 and the carriage pillar 152. The control yoke 150 may comprise the grips 160a-160b and the yoke shaft 162 (not visible from the perspective of the underside view 480). The buttons 180a-180n are shown on the grips 160a-160b. The carriage pillar 152 may extend down from the control yoke 150. The carriage pillar 152 may comprise the dual-fin pillar 282a-282b.

The inverted rail dual-fin controller 100" may comprise the inverted carriage platform 154" and the inverted cover plate 284' of the stationary platform 156. For illustrative purposes, the underside view 480 may comprise the inverted cover plate 284' of the stationary platform 156 shown without a bottom surface and/or the enclosure sides 286a-286d. A cover underside 482 of the inverted cover plate 284' and a carriage underside 484 of the inverted carriage platform 154" are shown. For example, without the bottom surface of the stationary platform 156 and/or the enclosure sides 286a-286d visible, the underside view 480 may provide a perspective view of the cover underside 482 and the carriage underside 484.

The cover underside 482 may comprise the inverted rails 172a'-172b', the fin slots 288a-288b, the inverted anchor bases 362a'-362b' and/or the support columns 486a-486k. In the inverted rail dual-fin controller 100", the inverted rails 172a'-172b' may be attached to the cover underside 482 of the inverted cover plate 284' instead of implementing the rails 172a-172b on the bottom surface of the stationary platform 156. The inverted rails 172a'-172b' may have a similar implementation as the rails 172a-172b. The inverted rails 172a'-172b' may be configured to guide the linear movement LM of the inverted carriage platform 154". The inverted rails 172a'-172b' may comprise the grooves 452 to enable an attachment to the groove lock 356 of the inverted rail risers 170a'-170d' of the inverted carriage platform 154".

The inverted anchor bases 362a'-362b' may be securely attached to the cover underside 482 of the inverted cover plate 284'. The inverted anchor bases 362a'-362b' may provide an anchor point for each end of the tensioner 208. The inverted anchor bases 362a'-362b' may be located at each end of the inverted cover plate 284' (e.g., at the enclosure side 286a and the enclosure side 286c). For example, one end of the tensioner 208 may be secured to the inverted anchor base 362a' and the other end of the tensioner 208 may be secured to the inverted anchor base 362b'.

The support columns 486a-486k may be securely attached to the cover underside 482 of the inverted cover plate 284'. The support columns 486a-486k may provide a spacer and/or structural support for the inverted cover plate 284'. For example, the support columns 486a-486k may prevent an end user from pressing the inverted cover plate 284' down into the stationary platform 156. A top of the support columns 486a-486k may be attached to the inverted cover plate 284' and a bottom of the support columns 486a-486k may be attached to the bottom surface of the stationary platform 156. In the example shown, the support columns 486a-486k may each have a rectangular shape that may be approximately 1.5-2 inches tall and approximately 0.5 inches wide and 0.5 inches thick. In the example shown, there may be ten of the support columns 486a-486k implemented. The size, shape and/or number of the support columns 486a-486k may be varied according to the design criteria of a particular implementation.

The inverted carriage platform 154" may comprise the inverted rail risers 170a'-170d'. The inverted rail risers 170a'-170d' may have a similar implementation as the rail risers 170a-170d. For example, four of the inverted rail risers 170a'-170d' may be implemented. The inverted rail risers 170a'-170d' may be implemented on a top surface of the inverted carriage platform 154". The inverted rail risers 170a'-170d' may attach to the inverted rails 172a'-172b'. The inverted rail risers 170a'-170d' may provide a connection of the inverted carriage platform 154" to the inverted cover plate 284'. The inverted rail risers 170a'-170d' may enable the linear movement LM of the inverted carriage platform 154".

The carriage underside 484 of the inverted carriage platform 154" may comprise the fastening block 168", the support bracket 364 and/or tensioner clamps 488a-488b. The fastening block 168" may have a similar implementation as the fastening block 168 shown in association with FIG. 8. For example, the fastening block 168" may comprise platform sockets 354a-354b configured to receive and/or secure the dual-fin pillar 282a-282b. The pitch sensor 306 and the pinion 366 may be connected to the support bracket 364. The tensioner clamps 488a-488b may provide a guide for the tensioner 208. For example, the tensioner 208 may be fed from the inverted anchor bases 362a'-362b' and through the tensioner clamps 488a-488b and through the fastening block 168" to provide resistance for the movement of the carriage platform 154. Each of the tensioner clamps 488a-488b may comprise a complementary piece on the top side of the inverted carriage platform 154". The complementary pieces for the tensioner clamps 488a-488b may enable the tensioner clamps 488a-488b to be fastened on the carriage underside 484 of the inverted carriage platform 154". The fastening block 168" may comprise a through hole along the carriage underside 484. The through hole of the fastening block 168" may provide a path and/or guide for the tensioner 208.

The stationary rack 204 is shown interlocked with the pinion 366. The stationary rack 204 may be mounted to the bottom surface of the stationary platform 156. The stationary rack 204 may have a similar implementation as described in association with FIG. 8. For example, in the inverted rail dual-fin controller 100", the inverted rails 172a'-172b' and the inverted anchor bases 362a'-362b' may be connected to the cover underside 482 of the inverted cover plate 284' and the stationary rack 204 may be mounted to the bottom of the stationary platform 156. Other components (e.g., the circuit 158) may be connected to the bottom of the stationary platform 156. The particular arrangement of the components within the stationary platform 156 and/or which components may be connected to the cover underside 482 of the inverted cover plate 284' may be varied according to the design criteria of a particular implementation.

The inverted rail dual-fin controller 100" may enable the stationary platform 156 to be implemented with a shorter height (e.g., compared to the dual-fin controller 100' shown in association with FIGS. 7-8). In an example, the inverted rail dual-fin controller 100" may be implemented with the stationary platform 156 having a height of approximately 1.85 inches (e.g., inclusive of the inverted cover plate 284' and the bottom surface of the stationary platform 156) and the dual-fin controller 100' may be implemented with the stationary platform 156 having a height of approximately 2 inches (e.g., inclusive of the cover plate 284 and the bottom surface of the stationary platform 156). For example, with the dual-fin controller 100', when the rail risers 170a-170d are implemented on the carriage underside 484 of the carriage platform 154, there may be a small gap in between the carriage platform 154 and the cover plate 284 to enable movement of the carriage platform 154 without rubbing against the cover plate 284. The gap may provide an extra empty space that may result in a taller stationary platform 156. In the inverted rail dual-fin controller 100″, instead of a gap of extra space between the inverted carriage platform 154″ and the inverted cover plate 284′, the space may be used to provide the inverted rail risers 170a′-170d′ and the inverted rails 172a′-172b′. The particular height of the stationary platform 156 may be varied according to the design criteria of a particular implementation.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"–"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"–"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
a control yoke comprising (i) a grip and (ii) a yoke shaft configured to enable a rotation of said control yoke;
a carriage pillar comprising (i) a carriage receptacle configured to attach to said yoke shaft and (ii) a pillar base;
a carriage platform comprising (i) a fastening portion configured to attach to said pillar base, and (ii) a rail carriage;
a stationary platform comprising a rail configured to (i) attach to said rail carriage and (ii) enable a linear movement of said carriage platform; and
a circuit configured to (i) measure said rotation of said control yoke, (ii) translate said rotation to a roll input, (iii) detect said linear movement of said carriage platform along said rail, (iv) translate said linear movement of said carriage platform to a pitch input, wherein
(a) said carriage pillar extends a height down from said carriage receptacle to said pillar base to enable a movement of said control yoke (i) above said carriage pillar to be equal to said linear movement of said carriage platform below said carriage pillar and (ii) to be translated a distance below said control yoke while said control yoke matches an authentic position of a yoke in an airplane being simulated, and (b) said height enables a clearance for a range of said rotation of said control yoke.

2. The apparatus according to claim 1, wherein said roll input and said pitch input are provided to a flight simulation software to control an aircraft being simulated by said flight simulation software.

3. The apparatus according to claim 2, wherein (i) said circuit is configured to sample said roll input and said pitch input according to a sampling time and (ii) said sampling time enables said roll input and said pitch input to update a movement of said aircraft being simulated by said flight simulation software.

4. The apparatus according to claim 1, wherein said rail comprises a linear motion tube.

5. The apparatus according to claim 1, wherein (a) said rail comprises (i) a first rail portion on a first side of said stationary platform and (ii) a second rail portion on a second side of said stationary platform across from said first rail portion, and (b) said rail carriage comprises (i) a first rail riser configured to attach to said first rail portion and (ii) a second rail riser configured to attach to said second rail portion.

6. The apparatus according to claim 1, wherein (i) said fastening portion is implemented as a fastening block connected to said carriage platform and (ii) said fastening block comprises (a) a first slot configured to attach to a first pillar fin of said carriage pillar and (b) a second slot configured to attach to a second pillar fin of said carriage pillar.

7. The apparatus according to claim 1, wherein (i) said fastening portion is implemented as a fastening block connected to said carriage platform and (ii) said fastening block comprises a slot configured to attach to a pillar fin of said carriage pillar.

8. The apparatus according to claim 1, wherein said circuit comprises at least one of a potentiometer, an optical encoder, and hall effect encoder.

9. The apparatus according to claim 1, wherein said circuit comprises (i) a first sensor connected to said yoke shaft and configured to measure said rotation of said control yoke, (ii) a second sensor connected to said stationary platform and configured to measure said linear movement of said carriage platform and (iii) a processor configured to (a) translate said rotation measured by said first sensor into a first voltage value for said roll input and (b) translate said linear movement measured by said second sensor to a second voltage value for said pitch input.

10. The apparatus according to claim 9, wherein (i) said first voltage value corresponds to a physical position of said control yoke, (ii) said second voltage value corresponds to a physical position of said carriage platform and (iii) said roll input and said pitch input are communicated to a computer.

11. The apparatus according to claim 9, wherein said second sensor comprises an encoder shaft configured to measure a gear rotation of a rack and pinion arrangement as said carriage platform moves forward or backward.

12. The apparatus according to claim 1, wherein said stationary platform is located at an adjustable height with respect to an instrument panel.

13. The apparatus according to claim 1, further comprising a cover plate located above said carriage platform, wherein said cover plate is configured to hide said carriage platform from view.

14. The apparatus according to claim 13, wherein (i) said rail is connected to a bottom of said stationary platform, (ii) said rail carriage is connected to an underside of said carriage platform and said rail and (iii) said cover plate is not attached to said carriage platform.

15. The apparatus according to claim 13, wherein (i) said rail is connected to an underside of said cover plate, (ii) said rail carriage is connected to a topside of said carriage platform and said rail and (iii) said rail carriage is located in between said cover plate and said carriage platform.

16. The apparatus according to claim 1, wherein (i) said control yoke further comprises a cavity and (ii) a roll encoder of said circuit and a processor of said circuit are implemented in said cavity.

17. The apparatus according to claim 16, wherein (i) said yoke shaft comprises a hollow channel, (ii) a plurality of wires are routed through said hollow channel into said cavity to connect to said processor, (iii) said plurality of wires extend down from said hollow channel along said carriage pillar to said stationary platform and (iv) at least one of said plurality of wires is configured to connect said processor and a pitch encoder of said circuit.

18. The apparatus according to claim 1, wherein (i) said circuit further comprises a force feedback mechanism and (ii) said force feedback mechanism is configured to (a) adjust an amount of resistance for moving said control yoke and (b) provide a rumble effect.

19. An apparatus comprising:

a control yoke comprising (i) a grip and (ii) a yoke shaft configured to enable a rotation of said control yoke;

a carriage pillar comprising (i) a carriage receptacle configured to attach to said yoke shaft and (ii) a pillar base;

a carriage platform comprising (i) a fastening portion configured to attach to said pillar base, and (ii) a rail carriage;

a stationary platform comprising a rail configured to (i) attach to said rail carriage and (ii) enable a linear movement of said carriage platform; and a circuit configured to (i) measure said rotation of said control yoke, (ii) translate said rotation to a roll input, (iii) 12 detect said linear movement of said carriage platform along said rail, (iv) translate said linear movement of said carriage platform 14 to a pitch input, wherein (a) said carriage pillar extends a height down from said carriage receptacle to said pillar base to align said control yoke to a level of an instrument display while said carriage platform provides said linear movement, and (b) said instrument display is arranged in front of said control yoke at said level.

20. The apparatus according to claim 19, wherein aligning said control yoke to said level enables a practical placement of said instrument display and a scenery display for an immersive flight simulation experience.

* * * * *